(12) United States Patent
Forticaux et al.

(10) Patent No.: US 11,168,193 B2
(45) Date of Patent: Nov. 9, 2021

(54) FOAMS AND METHODS OF MAKING

(71) Applicant: 3M INNOVATIVE PROPERTIES COMPANY, St. Paul, MN (US)

(72) Inventors: Audrey S. Forticaux, Minneapolis, MN (US); Joshua M. Fishman, Minneapolis, MN (US); Caitlin E. Meree, St. Paul, MN (US); Ying Lin, Woodbury, MN (US); Qin Lin, Woodbury, MN (US); Carla S. Thomas, Woodbury, MN (US); Duane D. Fansler, Dresser, WI (US); Jimmie R. Baran, Jr., Prescott, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 17/250,400

(22) PCT Filed: Jul. 23, 2019

(86) PCT No.: PCT/IB2019/056291
§ 371 (c)(1),
(2) Date: Jan. 18, 2021

(87) PCT Pub. No.: WO2020/026073
PCT Pub. Date: Feb. 6, 2020

(65) Prior Publication Data
US 2021/0253816 A1 Aug. 19, 2021

Related U.S. Application Data

(60) Provisional application No. 62/711,752, filed on Jul. 30, 2018.

(51) Int. Cl.
*C08J 9/10* (2006.01)
*C08F 220/10* (2006.01)
*C08K 3/105* (2018.01)
*C08K 3/11* (2018.01)
*C08F 222/10* (2006.01)
*C08F 220/36* (2006.01)
*C08J 9/00* (2006.01)
*C08K 3/22* (2006.01)
*C08K 3/38* (2006.01)
*C08K 3/40* (2006.01)
*C08K 7/18* (2006.01)

(52) U.S. Cl.
CPC ............ *C08J 9/102* (2013.01); *C08F 220/36* (2013.01); *C08F 222/102* (2020.02); *C08J 9/0066* (2013.01); *C08K 3/105* (2018.01); *C08K 3/11* (2018.01); *C08K 3/22* (2013.01); *C08K 3/38* (2013.01); *C08K 3/40* (2013.01); *C08K 7/18* (2013.01); *C08J 2333/10* (2013.01); *C08J 2333/14* (2013.01); *C08J 2375/16* (2013.01); *C08K 2003/2227* (2013.01); *C08K 2003/385* (2013.01)

(58) Field of Classification Search
CPC . C08F 222/102; C08F 220/36; C08J 2333/10; C08J 2333/14; C08J 2375/16; C08J 9/102
See application file for complete search history.

(56) References Cited

U.S. PATENT DOCUMENTS

| | | | | |
|---|---|---|---|---|
| 5,252,617 A * | 10/1993 | Werner | ................ | C08G 18/798 521/56 |
| 5,962,540 A * | 10/1999 | Friese | .................. | C08G 18/672 521/128 |
| 7,744,991 B2 | 6/2010 | Fischer | | |
| 8,137,807 B2 | 3/2012 | Clapper | | |
| 9,102,774 B2 | 8/2015 | Clapper | | |
| 9,629,283 B2 | 4/2017 | Soong | | |
| 2004/0138321 A1* | 7/2004 | Hashimoto | ............ | C08J 9/0061 521/134 |
| 2005/0213910 A1* | 9/2005 | Chang | ................ | C08G 18/4277 385/128 |
| 2010/0193984 A1* | 8/2010 | Hiroshige | .............. | C08J 9/0066 264/45.3 |
| 2014/0183403 A1 | 7/2014 | Peterson | | |
| 2015/0118929 A1* | 4/2015 | Nakai | .................. | D06N 3/0004 442/60 |
| 2018/0112115 A1 | 4/2018 | Hamada | | |

FOREIGN PATENT DOCUMENTS

| | | |
|---|---|---|
| CN | 102618036 | 8/2012 |
| CN | 106432583 | 2/2017 |
| CN | 107722167 | 2/2018 |
| JP | 2016064968 | 4/2016 |
| JP | 6152030 | 6/2017 |
| WO | WO 2011-119363 | 9/2011 |
| WO | WO 2015-178353 | 11/2015 |

OTHER PUBLICATIONS

Ding, "Development Of Thermally Conductive Polymer Matrix Composites By Foaming-Assisted Networking Of Micron- And Submicron-Scale Hexagonal Boron Nitride", Journal of Applied Polymer Science, 2016, vol. 133, No. 04, pp. pp. 1-12.
Chan, "Novel Thermally Conductive Thermoplastic/Ceramic Composite Foams", Macromolecular Materials and Engineering, 2012, vol. 297, No. 10, pp. 1014-1020.
International Search Report for PCT International Application No. PCT/IB2019/056291, dated Nov. 6, 2019, 5 pages.

* cited by examiner

*Primary Examiner* — Karuna P Reddy
(74) *Attorney, Agent, or Firm* — Jean A. Lown

(57) ABSTRACT

Reaction mixtures, foams prepared from the reaction mixtures, articles containing the foams, and methods of making the foams are provided. The polymeric material in the foam is formed from a polymerizable composition that includes a di(meth)acrylate oligomer and a monomer having a single ethylenically unsaturated group. The foams are highly filled (e.g., at least 60 volume percent of the foam is the filler) and can be thermally conductive. Although the foams contain a large amount of filler, the foams can be compressed at least 40 volume percent with an applied pressure of 50 pounds per square inch (345 kiloPascals).

15 Claims, 7 Drawing Sheets

FOAMS AND METHODS OF MAKING

CROSS REFERENCE TO RELATED APPLICATIONS

This application is a national stage filing under 35 U.S.C. 371 of PCT/IB2019/056291, filed Jul. 23, 2019, which claims the benefit of U.S. Provisional Patent Application No. 62/711,752, filed Jul. 30, 2018, the disclosure of which is incorporated by reference in its/their entirety herein.

BACKGROUND

Various foam compositions are known and can be used for multiple purposes. Some of these known foams contain fillers. There is growing interest in the use of foams containing fillers that are thermally conductive. These foams can be used in various thermal management applications such as removing heat from heat-generating electrical or electronic articles. Some known thermally conductive foams are described, for example, in U.S. Patent Application Publications 2010/0193984 (Hiroshige et al.) and 2014/0183403 (Peterson et al.), and U.S. Pat. No. 9,629,283 B2 (Soong et al.) and U.S. Pat. No. 7,744,991 B2 (Fischer et al.).

SUMMARY

Reaction mixtures, foams prepared from the reaction mixtures, articles containing the foams, and methods of making the foams are provided. The foams are highly filled and can be thermally conductive. The foams can be compressed and then recover when compression is terminated.

In a first aspect, a reaction mixture is provided that can be used to prepare a foam. The reaction mixture contains a) a polymerizable composition, b) an azo compound that is a free radical generator and that generates nitrogen gas when heated, and c) a filler. The polymerizable composition contains 1) a urethane di(meth)acrylate in an amount of 30 to 70 weight percent based on a total weight of the polymerizable composition and 2) at least one monomer having a single (meth)acryloyl group in an amount of 30 to 70 weight percent based on the total weight of the polymerizable composition. The urethane di(meth)acrylate, which has a number average molecular weight of at least 5000 grams/mole, has a hydrophobic group selected from an olefinic group with at least 12 carbon atoms or from a carbocyclic aromatic group. The azo compound is present in an amount of 20 to 70 grams per 100 grams of the polymerizable composition. The filler is present in an amount of at least 60 volume percent based on a total volume of the polymerizable composition and filler. The filler is spherical or roundish and has a circularity greater than 0.70. At least 90 percent of the filler has a longest dimension greater than 50 micrometers.

In a second aspect, a foam is provided. The foam contains a) a polymeric material containing a reaction product of a polymerizable composition and b) a filler in an amount of at least 60 volume percent based on a total volume of the polymeric material plus filler. The polymerizable composition contains 1) a urethane di(meth)acrylate in an amount of 30 to 70 weight percent based on a total weight of the polymerizable composition and 2) at least one monomer having a single (meth)acryloyl group in an amount of 30 to 70 weight percent based on the total weight of the polymerizable composition. The urethane di(meth)acrylate has a number average molecular weight of at least 5,000 grams/mole and has a hydrophobic group selected from an olefinic group with at least 12 carbon atoms or from a carbocyclic aromatic group. The filler is present in an amount of at least 60 volume percent based on a total volume of the polymeric material and filler. The filler is spherical or roundish and has a circularity greater than 0.70. At least 90 percent of the filler has a longest dimension greater than 50 micrometers. The foam has a void volume of 25 to 50 volume percent based on a total volume of the foam in an uncompressed state.

In a third aspect, an article is provided that includes a foam. The foam is the same as described in the second aspect.

In a fourth aspect, a method of making a foam is provided. The method includes preparing a reaction mixture as described in the first aspect. The method further includes positioning the reaction mixture in a mold and heating the reaction mixture to a temperature sufficient to activate the azo compound within the reaction mixture, to form a polymeric material from the polymerizable material, and to form voids within the polymeric material.

DETAILED DESCRIPTION

Figure 1:
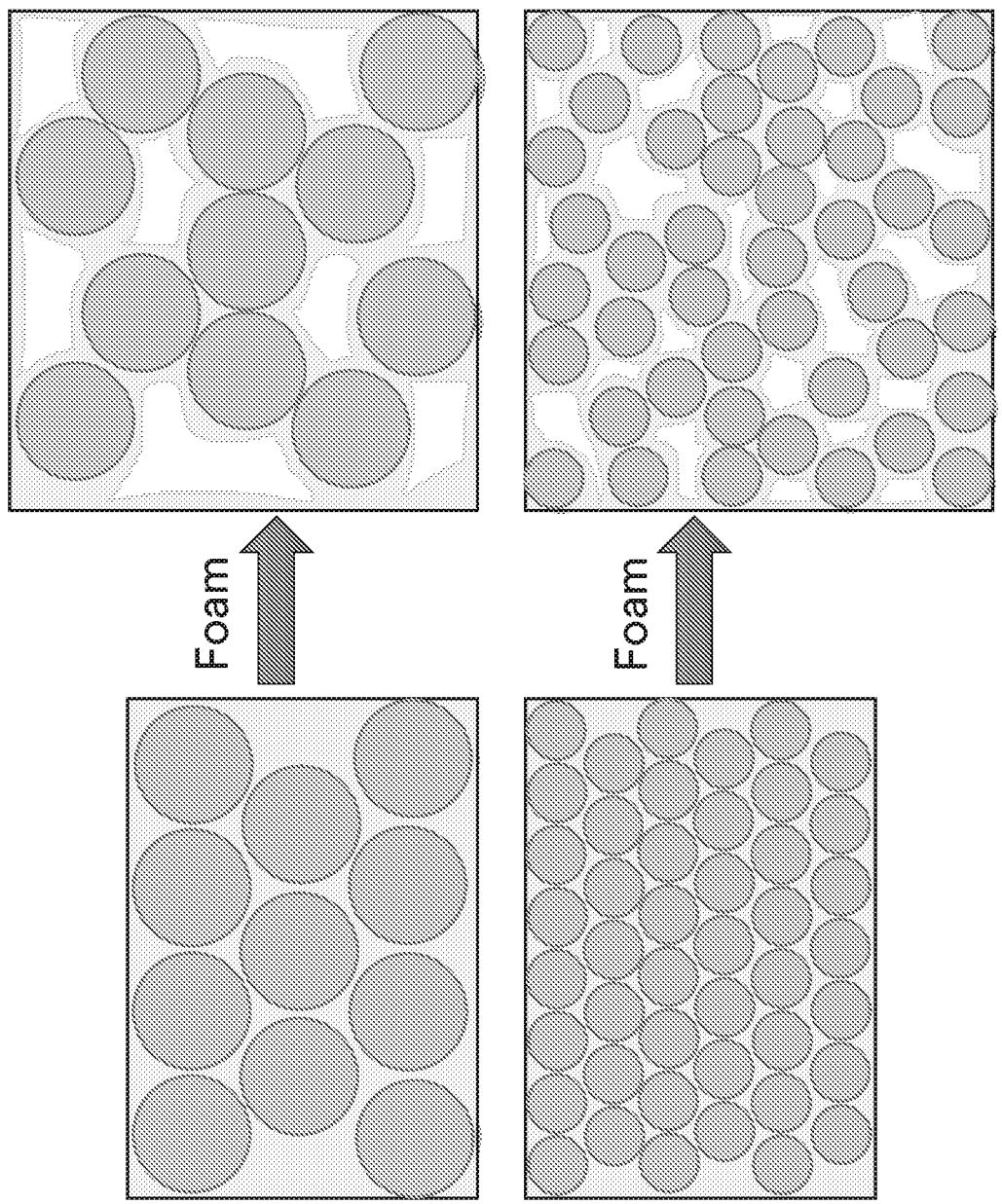
FIG. 1 illustrates that foams containing larger particles tend to have larger interstitial space where foaming can occur.

Reaction mixtures, foams prepared from the reaction mixtures, articles containing the foams, and methods of making the foams are provided. The polymeric material in the foam is formed from a polymerizable composition that includes a urethane di(meth)acrylate oligomer and at least one monomer having a single ethylenically unsaturated group. The foams are highly filled (e.g., at least 60 volume percent based on the total volume of the polymeric material and filler) and can be thermally conductive. Although the foams contain a large amount of filler, the foams can be compressed at least 40 volume percent with an applied pressure of 50 pounds per square inch (345 kiloPascals, kPa).

As used herein, the terms "a", "an", and "the" are used interchangeably and are equivalent to saying one or more than one.

The term "and/or" such as A and/or B means A alone, B alone, or both A and B.

The term "room temperature" refers to a temperature of 22° C. to 25° C.

The recitation of numerical ranges by endpoints includes the endpoints, all numbers within that range (e.g. 1 to 5 includes 1, 1.5, 2, 2.75, 3, 3.80, 4, and 5), and any range within that range.

The term "monomer" refers to a compound having an ethylenically unsaturated group. The term monomer is independent of the molecular weight and can include oligomeric materials. The ethylenically unsaturated group is often a (meth)acryloyl group, which refers to a group of formula $CH_2=CR—(CO)—$ where R is hydrogen or methyl. That is, the term "(meth)acryloyl" refers to an acryloyl group where R is hydrogen or to a methacryloyl group where R is methyl.

The term "(meth)acrylate" refers to a monomer or oligomer having at least one (meth)acryloyloxy group, which is a group of formula $CH_2=CR—(CO)—O—$ where R is hydrogen or methyl.

The term "polymerizable composition" refers to the portion of the reaction mixture that is a monomer. The monomers typically have one or two ethylenically unsaturated group. This includes the urethane di(meth)acrylate and the monomer having a single ethylenically unsaturated group.

As used herein, the term "elastomeric" refers to a polymeric material that can be compressed when pressure is applied and that can at least partially recover when pressure is no longer applied.

The term "aspect ratio" refers to the average length (longest dimension) of the filler particles divided by the average width of the filler particles. The aspect ratio can be determined by measuring the length and width of a plurality of particles shown on an electron micrograph.

The term "circularity" describes the closeness of the shape of a particle (i.e., the shape of the outer perimeter of the particle) to that of a circle. Circularity can be calculated by dividing the area of the particle as seen on an electron micrograph by the area of a circle having a diameter equal to the Feret diameter of the particle (which corresponds to the distance of the longest line that can be drawn through the particle). The circularity of a sphere is 1, the circularity of a square is 0.63, and the circularity of a line is 0.

Reaction Mixture for Forming Foam

A reaction mixture is provided that can be used to form a foam. The reaction mixture contains a) a polymerizable composition that includes 1) a urethane di(meth)acrylate, which is an oligomer, and 2) at least one monomer having a single (meth)acryloyl group, b) an azo compound that is a free radical generator and that generates nitrogen gas when heated, and c) a filler. Each of these components is described below.

Polymerizable Composition

The polymerizable composition contains at least one urethane di(meth)acrylate and at least one monomer having a single (meth)acryloyl group. The polymeric material formed from the polymerizable material is an elastomeric material. The elastomeric material contributes to the foam being soft and conformable to another surface. Furthermore, the elastomeric material facilitates the recovery of the foam after being compressed. The elastomeric material is typically not a pressure-sensitive adhesive.

In most applications, it is desirable that the foam be flexible. To provide flexibility and structural integrity to the foam, a urethane di(meth)acrylate is included in the polymerizable composition that is an oligomer. The urethane di(meth)acrylate has two (meth)acryloyloxy groups and typically has a number average molecular weight (Mn) of at least 5,000 to 20,000 Daltons (grams/mole) as measured using Gel Permeation Chromatography. The number average molecular weight can be at least 5,000 Daltons, at least 6,000 Daltons, at least 8,000 Daltons, or at least 10,000 Daltons and up to 20,000 Daltons, up to 18,000 Daltons, up to 16,000 Daltons, up to 15,000 Daltons, up to 14,000 Daltons, up to 12,000 Daltons, or up to 10,000 Daltons. If the number average molecular weight is less than 5,000 Daltons, the foam tends to break when compressed. If the number average molecular weight is greater than 20,000 Daltons, however, the foam tends to not recover sufficiently after being compressed and the viscosity of the polymerizable composition may be too high.

Suitable urethane di(meth)acrylates usually have a glass transition temperature in a range of −60° C. to −20° C. as measured for the corresponding homopolymer with Differential Scanning calorimetry. The glass transition temperature is at least −60° C., at least −55° C., at least −50° C., at least −45° C., at least −40° C. and up to −20° C., up to −25° C., up to −30° C., or up to −35° C. If the glass transition temperature is less than −60° C., the resulting foam tends to be friable. That is, the foam tends to crumble when compressed. If the glass transition temperature is greater than −20° C., then the resulting polymeric material may have a glass transition temperature that is too high, as evidenced by the polymeric material not being sufficiently soft and conformable to other surfaces. The urethane di(meth)acrylate typically has at least two urethane linkages —NH—(CO)—O—.

The urethane di(meth)acrylate is typically selected to be relatively hydrophobic. The urethane di(meth)acrylate often contains a carbocyclic aromatic group or a hydrocarbon group with at least 12 carbon atoms. The urethane di(meth)acrylate is usually based on a polyester or polyolefin backbone and is usually not based on a polyether backbone. There can be a plurality of different urethane di(meth)acrylates in the polymerizable composition.

In some embodiments, the urethane portion is formed by reacting an aromatic diisocyanate with a polyester polyol material. For example, the aromatic urethane di(meth)acrylate can be the reaction product of a polyester polyol, an aromatic diisocyanate such as toluene diisocyanate, and a hydroxyalkyl (meth)acrylate such as hydroxyethyl (meth)acrylate or hydroxypropyl (meth)acrylate. Such urethane di(meth)acrylates can be referred to as aromatic polyester urethane di(meth)acrylates.

In other embodiments, the urethane di(meth)acrylate is aliphatic but includes a hydrocarbon segment having at least 12 carbon atoms. For example, the resulting hydrophobic aliphatic urethane di(meth)acrylate can be the reaction product of a hydrocarbon having terminal hydroxyl groups (e.g., hydroxyl terminated hydrogenated vinyl butadiene), an aliphatic diisocyanate such as isophorone diisocyanate, and a hydroxyalkyl (meth)acrylate such as hydroxylethyl (meth)acrylate or hydroxypropyl (meth)acrylate. Such urethane di(meth)acrylates can be referred to as hydrophobic aliphatic urethane di(meth)acrylates.

Suitable examples of urethane di(meth)acrylates include, but are not limited to, those commercially available from Sartomer (Exton, Pa., USA) under the trade designations CN9070 (a hydrophobic aliphatic urethane diacrylate having a hydrogenated vinyl butadiene backbone), CN973H85 (an aromatic polyester based urethane diacrylate that is blended with 15 weight percent 2-(2-ethoxyethoxy) ethyl acrylate), and CN973J75 (an aromatic polyester based urethane diacrylate that is blended with 25 weight percent isobornyl acrylate).

The polymerizable composition typically does not include a monomer having more than two ethylenically unsaturated groups such as a tri(meth)acrylate or a tetra(meth)acrylate. If present, the polymerizable composition contains less than 5 weight percent, less than 4 weight percent, less than 2 weight percent, or less than 1 weight percent of a monomer having more than 2 ethylenically unsaturated groups. That is, the amount of this monomer is in a range of 0 to 5 weight percent, 0 to 4 weight percent, 0 to 2 weight percent, or 0 to 1 weight percent based on the weight of the polymerizable composition. Larger amounts of tri(meth)acrylates or tetra (meth)acrylates can diminish compressibility and/or recovery (i.e., recovery after being compressed) of the resulting foam. Stated differently, the crosslink density may be too high.

Further, the polymerizable composition typically does not include a di(meth)acrylate having a number average molecular weight that is less than 500 Daltons. For example, it typically does not include an alkylene di(meth)acrylate or an alkylene oxide di(meth)acrylate that is less than 500 Daltons. If present, the polymerizable composition contains less than 5 weight percent, less than 4 weight percent, less than 2 weight percent, or less than 1 weight percent of the di(meth)acrylate having a number average molecular weight less than 500 Daltons. That is, the amount of this monomer is in a range of 0 to 5 weight percent, 0 to 4 weight percent, 0 to 2 weight percent, or 0 to 1 weight percent based on the weight of the polymerizable composition. Larger amounts of these lower molecular weight di(meth)acrylate monomers can diminish compressibility and/or recovery (i.e., recovery after being compressed) of the resulting foam. Stated differently, the crosslink density may be too high.

The urethane di(meth)acrylate is combined in the polymerizable composition with one or more other monomers that have a single ethylenically unsaturated group. The ethylenically unsaturated group is typically a (meth)acryloyl group. The monomer often has a (meth)acryloyloxy group. The monomer is selected so that the resulting polymeric material is elastomeric.

The monomer having a single ethylenically unsaturated group is typically selected to be miscible with the urethane di(meth)acrylate. The monomer is often an alkyl (meth) acrylate. The alkyl group can be linear, branched, cyclic, bicyclic, tricyclic, or a combination thereof. Exemplary alkyl (meth)acrylates include, but are not limited to, methyl (meth)acrylate, ethyl (meth)acrylate, n-propyl (meth)acrylate, isopropyl (meth)acrylate, n-butyl (meth)acrylate, isobutyl (meth)acrylate, n-pentyl (meth)acrylate, 2-methylbutyl (meth)acrylate, n-hexyl (meth)acrylate, cyclohexyl (meth)acrylate, 3,3,5-trimethylcyclohexyl (meth)acrylate, 4-methyl-2-pentyl (meth)acrylate, 2-ethylhexyl (meth)acrylate, 2-methylhexyl (meth)acrylate, n-octyl (meth)acrylate, isooctyl (meth)acrylate, 2-octyl (meth)acrylate, isononyl (meth)acrylate, isoamyl (meth)acrylate, n-decyl (meth)acrylate, isodecyl (meth)acrylate, 2-propylheptyl (meth)acrylate, isotridecyl (meth)acrylate, isobornyl (meth)acrylate, isostearyl (meth)acrylate, octadecyl (meth)acrylate, 2-octyldecyl (meth)acrylate, dodecyl (meth)acrylate, lauryl (meth)acrylate, dicyclopentenyl (meth)acrylate, 1-adamantyl (meth) acrylate, 2-adamantyl (meth)acrylate, and heptadecyl (meth) acrylate. Some exemplary branched alkyl (meth)acrylates are (meth)acrylic acid esters of Guerbet alcohols having 12 to 32 carbon atoms as described in U.S. Pat. No. 8,137,807 (Clapper et al.). The alkyl monomers can be a single isomer or an isomer blend such as those described in U.S. Pat. No. 9,102,774 (Clapper et al.).

Other monomers with a single ethylenically unsaturated group that can be used are heteroalkyl (meth)acrylates. The heteroalkyl group can be linear, branched, cyclic, bicyclic, or a combination thereof. The heteroatom is often oxygen (—O—) but can be sulfur (—S—) or nitrogen (—NH—). The heteroalkyl often has 2 to 12 carbon atoms and 1 to 4 heteroatoms or 4 to 10 carbon atoms and 1 to 3 heteroatoms. Exemplary heteroalkyl (meth)acrylates include, but are not limited to, alkoxylated alkyl (meth)acrylates such as 2-(2-ethoxyethoxy)ethyl (meth)acrylate, 2-methoxyethyl (meth) acrylate, and 2-ethoxyethyl (meth)acrylates.

Still other monomers with a single ethylenically unsaturated group that can include a urethane linkage (—NH—(CO)—O—). For example, the monomers are urethane (meth)acrylates. One specific example is 2-[[(butylamino) carbonyl]oxy]ethyl acrylate, which is commercially available under the trade designation GENOMER G1122 from Rahn USA Corp. (Aurora, Ill., USA).

Yet other monomers with a single ethylenically unsaturated group have an unsaturated ring such as dicyclopentenyloxyethyl (meth)acrylate, benzyl (meth)acrylate, and phenyl (meth)acrylate.

The monomer with a single ethylenically unsaturated group typically does not contain an ionic group such as an acidic group or an amino group. Further, this monomer typically does not contain a hydroxyl group.

The polymerizable composition usually has a percent crosslink density in a range of 2 to 10 percent. The percent crosslink density is equal to 100×(moles of ethylenically unsaturated groups in monomers having at least two ethylenically unsaturated groups) divided by (total moles of ethylenically unsaturated groups in all monomers). The moles of ethylenically unsaturated groups for the urethane di(meth)acrylate is two times the moles of urethane di(meth) acrylate included in the polymerizable composition while the moles of ethylenically unsaturated groups in the monomer having a single ethylenically unsaturated group is equal to the moles of that monomer. If the percent crosslink density is higher than 10, the foam tends to be too stiff and breaks readily when compressed. If the crosslink density is less than 2, however, the foam tends to not recover after being compressed. The percent crosslink density can be at least 2, at least 3, at least 4, at least 5, at least 6 and up to 10, up to 9, up to 8, up to 7, up to 6, or up to 5.

The polymerizable composition usually contains 30 to 70 weight percent urethane di(meth)acrylate based on the total weight of the polymerizable composition. If the polymerizable composition contains less than 30 weight percent urethane di(meth)acrylate, the resulting foam may be too soft or may crumble apart. If the polymerizable composition contains more than 70 weight percent urethane di(meth) acrylate, however, the resulting foam may be too stiff and may develop cracks, especially when pressure is applied. The amount can be at least 30 weight percent, at least 35 weight percent, at least 40 weight percent, at least 45 weight percent, at least 50 weight percent, at least 55 weight percent, or at least 60 weight percent. The amount can be up to 70 weight percent, up to 65 weight percent, up to 60 weight percent, up to 55 weight percent, or up to 50 weight percent.

Similarly, the polymerizable composition usually contains 30 to 70 weight percent monomer having a single ethylenically unsaturated groups based on the total weight of the polymerizable composition. If the amount of this monomer is too low, there may be too much di(meth)acrylate in the polymerizable composition and the resulting foam may be too stiff and may crack. If the amount of this monomer is too high, however, there may not be sufficient urethane di(meth)acrylate in the polymerizable composition and the resulting foam may be too soft or may crumble apart. The amount of monomer having a single ethylenically unsaturated group can be at least 30 weight percent, at least 35 weight percent, at least 40 weight percent, at least 45 weight percent, at least 50 weight percent, at least 55 weight percent, or at least 60 weight percent. The amount can be up to 70 weight percent, up to 65 weight percent, up to 60 weight percent, up to 55 weight percent, or up to 50 weight percent.

The polymerizable composition often contains 30 to 70 weight percent urethane di(meth)acrylate and 30 to 70 weight percent monomer having a single ethylenically unsaturated group based on the total weight of the polymerizable composition. For example, the polymerizable composition can contain 40 to 70 weight percent urethane di(meth)acrylate and 30 to 60 weight percent monomer having a single ethylenically unsaturated group, 50 to 70 weight percent urethane di(meth)acrylate and 30 to 50 weight percent monomer having a single ethylenically unsaturated group, 60 to 70 weight percent urethane di(meth)acrylate and 30 to 40 weight percent monomer having a single ethylenically unsaturated group, 30 to 60 weight percent urethane di(meth)acrylate and 40 to 70 weight percent monomer having a single ethylenically unsaturated group, 30 to 50 weight percent urethane di(meth)acrylate and 50 to 70 weight percent monomer having a single ethylenically unsaturated group, or 30 to 40 weight percent urethane di(meth)acrylate and 60 to 70 weight percent monomer having a single ethylenically unsaturated group. In many embodiments, the only monomers present in the polymerizable composition are the urethane di(meth)acrylate and the monomer having a single ethylenically unsaturated group.

There can be a single or multiple different urethane di(meth)acrylates and a single monomer or multiple different monomers having a single ethylenically unsaturated group.

Azo Compound

The reaction mixture includes an azo compound. The azo compound performs two functions in the reaction mixture. First, the azo compound functions as a free radical initiator for polymerization of the monomers in the polymerizable composition. Second, in the process of functioning as a free radical initiator, nitrogen gas is generated when the reaction mixture is heated. The nitrogen gas creates voids in the resulting polymeric material. That is, the azo compound functions as foaming agent.

Not all azo compounds can perform both functions. Suitable azo compounds are often of Formula (I).

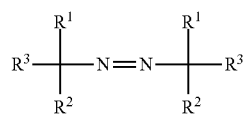
(I)

Each group $R^1$ and $R^2$ is independently an alkyl. Each group $R^3$ is independently —CN, a group of formula —(C=O)—$OR^4$ where $R^4$ is an alkyl, a group of formula —(C=O)—NH—$R^5$—OH where $R^5$ is an alkylene, a heterocyclic having 5 or 6 ring members and at least one nitrogen heteroatom, a group of formula —(C=NH)—NH—$R^6$—(C=O)—OH where $R^6$ is an alkylene, or —(C=NH)—$NH_2$. The alkyl groups $R^1$, $R^2$, and $R^4$ and the alkylene groups $R^5$ and $R^6$ can each independently have 1 to 6 carbon atoms, 1 to 4 carbon atoms, 1 to 3 carbon atoms, or 1 to 2 carbon atoms. An example heterocyclic ring for $R^3$ is imidazolinyl.

One azo compound that is particularly effective is 2,2'-azobis(2,4-dimethylvalerontrile), which is commercially available under the trade designation VAZO 52 from CHEMOURS (Wilmington, Del., USA). This compound is of Formula (I) where each $R^1$ is isobutyl, each $R^2$ is methyl, and each $R^3$ is —CN. This azo compound is particularly effective because it can generate free radicals and nitrogen gas at relatively low temperatures (the half-life of the compound is 10 hours at 52° C.). Another azo compound that may be useful is 2,2'-azobis(isobutyronitrile) (AIBN), which is commercially available under the trade designation VAZO 64 from CHEMOURS (the half-life of VAZO 64 is 10 hours at 64° C.). This azo compound is of Formula (I) where each $R^1$, each $R^2$ is methyl, and each $R^3$ is —CN. Still another azo compound that may be useful is 2,2'-azobis(2-methylbutyronitrile) (AMBN), which is commercially available under the trade designation VAZO 67 from CHEMOURS (the half-life of VAZO 67 is 10 hours at 67° C.). This azo compound is of Formula (I) where each $R^1$ is ethyl, each $R^2$ is methyl, and each $R^3$ is —CN. VAZO 64 and VAZO 67, however, require the use of higher temperatures for the initiation of polymerization.

Other azo compounds that may be useful include those commercially available from Wako Chemicals USA, Inc. (Richmond, Va., USA). One such azo compound is available under the trade designation V-601, which is dimethyl 2,2'-azobis(2-methylpropionate) having a half-life of 10 hours at 66° C. This compound is of Formula (I) where each $R^1$ is methyl, each $R^2$ is methyl, and each $R^3$ is —(C=O)—$OCH_3$ (i.e., $R^4$ is methyl). Another azo compound is available under the trade designation VA-086, which is 2,2'-azobis[2-methyl-N-(2-hydroxyethyl)propionamide] having a half-life of 10 hours at 86° C. This compound is of Formula (I) where each $R^1$ is methyl, each $R^2$ is methyl, and each $R^3$ is —(C=O)—NH—$CH_2CH_2$—OH (i.e., $R^5$ is ethylene). Another azo compound is available under the trade designation VA-061, which is 2,2'-azobis[2-(2-imidazolin-2-yl)propane] having a half-life of 10 hours at 61° C. This compound is of Formula (I) where each $R^1$ is a methyl, each $R^2$ is a methyl, and each $R^3$ is an imidazolinyl group (i.e., a five-membered ring with two nitrogen heteroatoms). Yet another azo compound is available under the trade designation VA-057, which is 2,2'-azobis[N-(2-carboxyethyl)-2-methylpropionamidine]tetrahydrate having a half-life of 10 hours at 57° C. This compound is of Formula (I) where each $R^1$ is methyl, each $R^2$ is methyl, and each $R^3$ is —(C=NH)—NH—$CH_2CH_2$—COOH (i.e., $R^6$ is ethylene). Still another azo compound is available under the trade designation V-50, which is 2,2'-azobis(2-methylpropionamidine)dihydrochloride having a half-life of 10 hours at 56° C. This compound is of Formula (I) where each $R^1$ is methyl, each $R^2$ is methyl, and each $R^3$ is —(C=NH)—$NH_2$.

The azo compound is present in an amount of 20 to 70 grams per 100 grams of the polymerizable composition. If lower amounts are used, the number of voids created in the resulting foam may be insufficient. If higher amounts are used, however, the amount of nitrogen gas formation may be excessive. The amount can be at least 20 grams, at least 25 grams, at least 30 grams, at least 35 grams, at least 40 grams, at least 45 grams, or at least 50 grams per 100 grams of the polymerizable composition and can be up to at 70 grams, up to 65 grams, up to 60 grams, up to 55 grams, or up to 50 grams per 100 grams of the polymerizable composition.

Filler

A filler is added to the reaction mixture. The filler can impart desirable characteristics to the resulting foam. For example, in some embodiments, the filler is selected to be a thermally conductive material. As such, the resulting foam can be thermally conductive.

The amount of filler in the reaction mixture is typically in a range of 60 to 80 volume percent based on a total volume of the polymerizable composition and the filler. It can be challenging to include this much filler in a foam. The use of this much filler, however, is desirable to impart characteristics of the filler, such as thermal conductivity, to the foam. If the amount of the filler is less than 60 volume percent, the desirable characteristics of the filler may not be imparted to the foam. Further, the viscosity of the reaction mixture might be so low that the filler particles separate from the polymerizable composition. If the amount of the filler is greater than 80 percent, however, the amount of polymeric material in the resulting foam may be insufficient and the foam may not be compressible. The amount of filler is often at least 60 volume percent, at least 65 volume percent, at least 70 volume percent and up to 80 volume percent, up to 75 volume percent, or up to 70 volume percent based on the total volume of the polymerizable composition and filler. Preferably, the filler is uniformly distributed throughout the reaction mixture and does not separate from the polymerizable composition. That is, the filler is preferably suspended in the polymerizable composition.

The size and shape of the filler can influence the compressibility of the resulting foam as well as its recovery after being compressed. The filler is typically spherical or roundish in shape. The term "roundish", when used to describe the filler, means that the filler particles are either spherical-like with one or more protrusions and/or asperities or spheroidal-like with one or more protrusions and/or asperities. Spherical or roundish filler particles can have interstitial spaces that contain polymeric material where foaming can occur (where voids in the polymeric material can result). The fillers are not chunks with different shapes.

The shape of the filler particles can be characterized by measuring the circularity. Circularity can be calculated by dividing the area of the particle as seen on an electron micrograph by the area of a circle having a diameter equal to the Feret diameter of the particle (which corresponds to the distance of the longest line that can be drawn through the particle). The circularity of multiple particles is usually determined and reported as an average value. The circularity of a sphere is 1, the circularity of a square is 0.63, and the circularity of a line is 0.

The circularity of the filler particles is at least 0.70, at least 0.75, at least 0.80, at least 0.85, at least 0.90, at least 0.95, or at least 0.98 and can be up to 1.0, up to 0.99, up to 0.98, up to 0.95, up to 0.92, up to 0.90, up to 0.85, or up to 0.80. The circularity can be, for example, in a range of 0.70 to 1.0, in a range of 0.75 to 1.0, in a range of 0.80 to 1.0, in a range of 0.85 to 1.0, in a range of 0.88 to 1.0, in a range of 0.90 to 1.0, in a range of 0.92 to 1.0, in a range of 0.95 to 1.0, in a range of 0.80 to 0.99, in a range of 0.85 to 0.99, or in a range of 0.90 to 0.99.

Spherical filler particles often have a circularity in a range of 0.80 to 1.0, in the range of 0.85 to 1.0, in a range of 0.88 to 1.0, in a range of 0.90 to 1.0, in a range of 0.92 to 1.0, or in a range of 0.95 to 1.0. Roundish filler particles tend to have a circularity in a range of 0.70 to less than 0.80 or in a range of 0.75 to less than 0.80.

The filler typically has a low aspect ratio. The aspect ratio is equal to the length (longest dimension) divided by the width of the filler particle. The aspect ratio is typically in a range of 1.0 to 1.35. Spherical fillers have an aspect ratio close to 1.0 (such as in a range of 1.0 to less than 1.1) and a circularity of 0.80 to 1.0. Roundish fillers have an aspect ratio in a range of 1.1 to 1.35 and a circularity in a range of 0.70 to less than 0.80.

The size of the filler particles can be measured using laser diffraction methods. At least 90 percent of the filler particles typically have a size that is greater than 50 micrometers. This size is often referred to as "D10" or as the "D10 size" when the particle size is measured. The term "D10 size" means that 10 percent of the particles in the particle size distribution have a diameter (e.g., longest dimension) less than or equal to D10 and 90 percent of the particles in the particle size distribution have a diameter (e.g., longest dimension) greater than D10. The D10 size can be greater than 50 micrometers, greater than 60 micrometers, greater than 70 micrometers, greater than 80 micrometers, greater than 90 micrometers, greater than 100 micrometers, greater than 150 micrometers, greater than 200 micrometers, greater than 300 micrometers, greater than 400 micrometers, or greater than 500 micrometers and can be up to 1000 micrometers, up to 800 micrometers, up to 600 micrometers, up to 500 micrometers, up to 300 micrometers, or up to 200 micrometers.

At least 50 percent of the filler particles typically have a size that is greater than 60 micrometers. This size is often referred to as "D50" or as the "D50 size" when the particle size is measured. The term "D50 size" means that 50 percent of the particles in the size distribution have a diameter (e.g., longest dimension) less than or equal to D50 and 50 percent of the particles in the particle size distribution have a diameter (e.g., longest dimension) greater than D50. The D50 size can greater than 60 micrometers, greater than 70 micrometers, greater than 80 micrometers, greater than 90 micrometers, greater than 100 micrometers, greater than 150 micrometers, greater than 200 micrometers, greater than 300 micrometers, greater than 400 micrometers, or greater than 500 micrometers and can be up to 1200 micrometers, up to 1000 micrometers, up to 800 micrometers, up to 600 micrometers, up to 500 micrometers, up to 300 micrometers, or up to 200 micrometers.

At least 10 percent of the filler particles typically have a size that is greater than 100 micrometers. This size is often referred to as "D90" or as the "D90 size" when the particle size is measured. The term "D90 size" means that 90 percent of the particles in the size distribution have a diameter (e.g., longest dimension) less than or equal to D90 and 10 percent of the particles in the particle size distribution have a diameter (e.g., longest dimension) greater than D90. The D90 size can be greater than 200 micrometers, greater than 400 micrometers, or greater than 500 micrometers and can be up to 1500 micrometers, up to 1200 micrometers, up to 1000 micrometers, up to 800 micrometers, up to 600 micrometers, up to 400 micrometers, or up to 200 micrometers.

Figure 2:
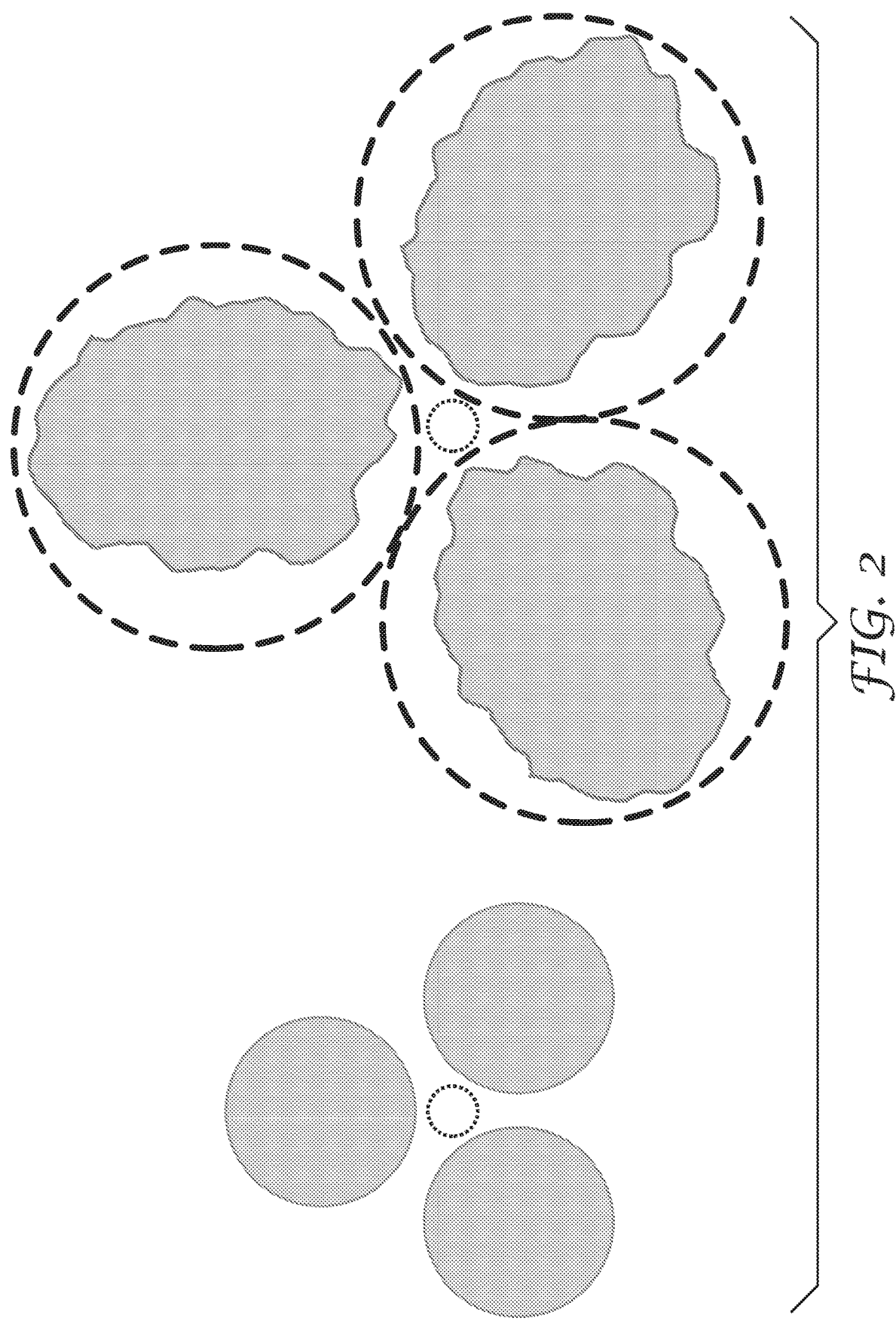
FIG. 2 illustrates that to form the same interstitial space between particles, the size of roundish particles typically need to be larger than spherical particles.
Figure 3:
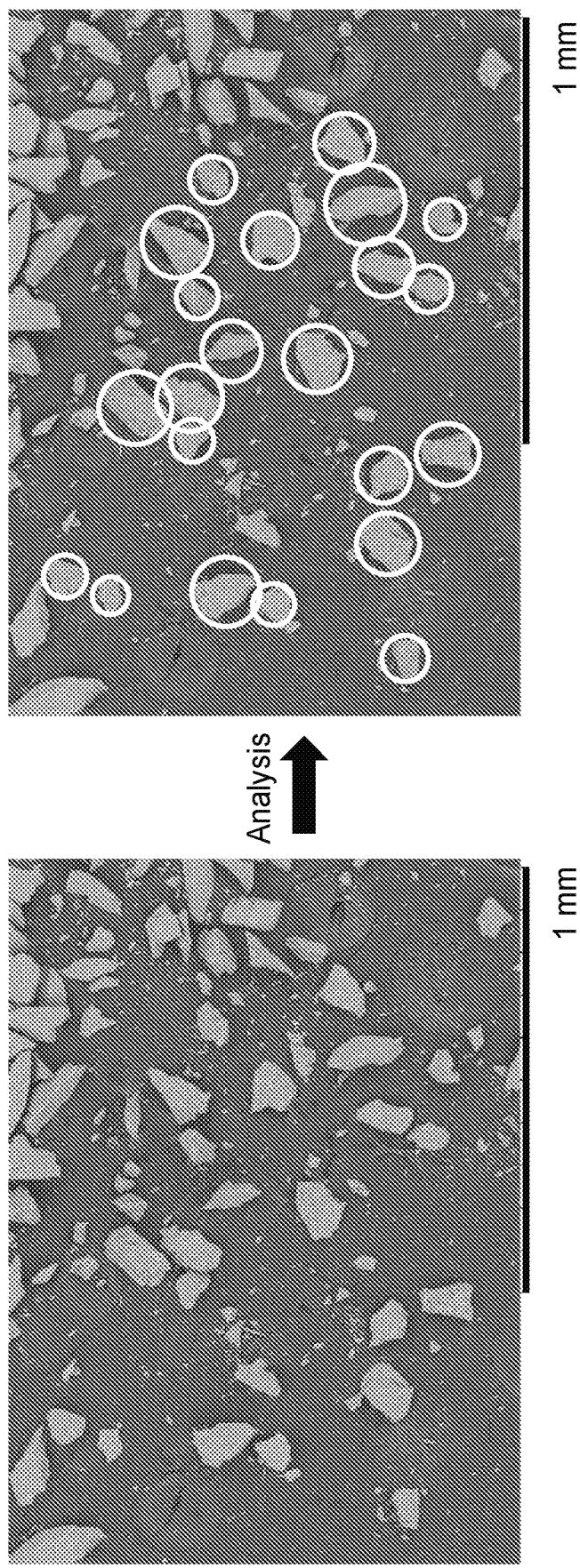
FIG. 3 illustrates the particles used to measure circularity, which is 0.51, for the alumina chunks used in Comparative Example 4.
Figure 4:
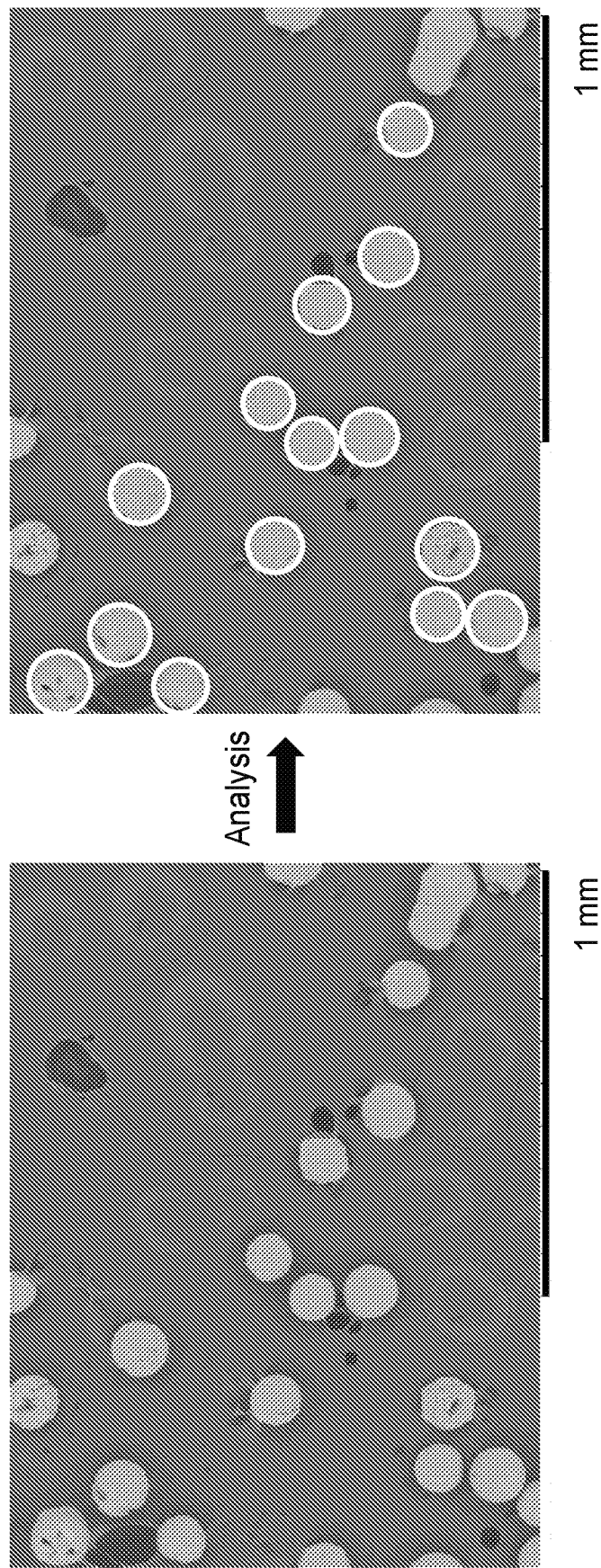
FIG. 4 illustrates the particles used to measure circularity, which is 0.92, for the spherical alumina particles used in Example 1 and other examples.
Figure 5:
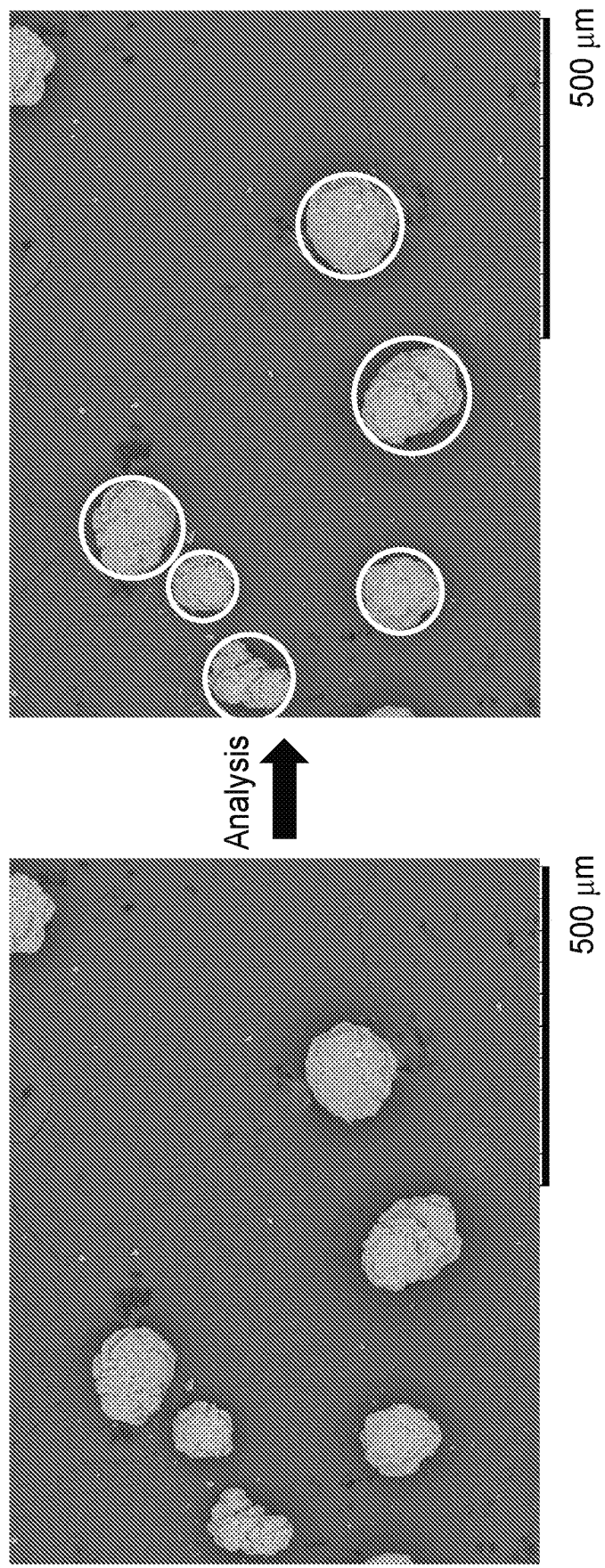
FIG. 5 illustrates the particles used to measure circularity, which is 0.75, for the roundish alumina trihydrate (ATH) particles used in Example 6.
Figure 6:
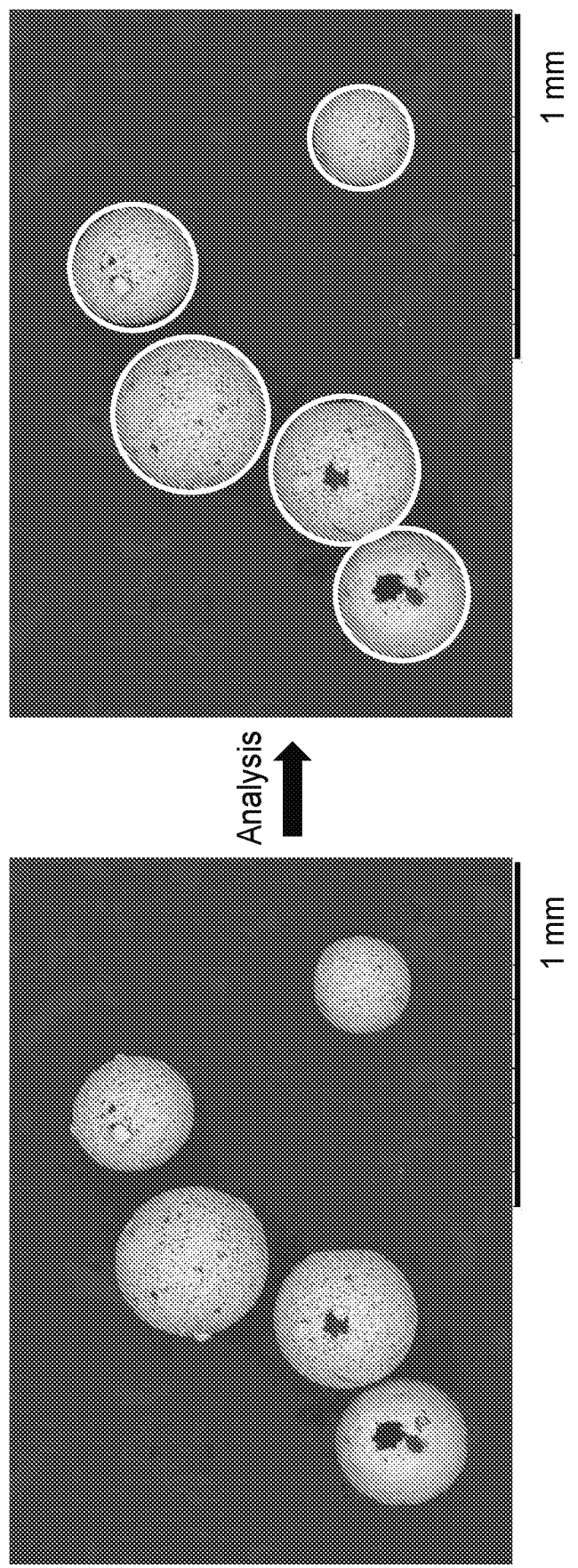
FIG. 6 illustrates the particles used to measure circularity, which is 0.82, for the spherical bronze particles used in Example 5.
Figure 7A:
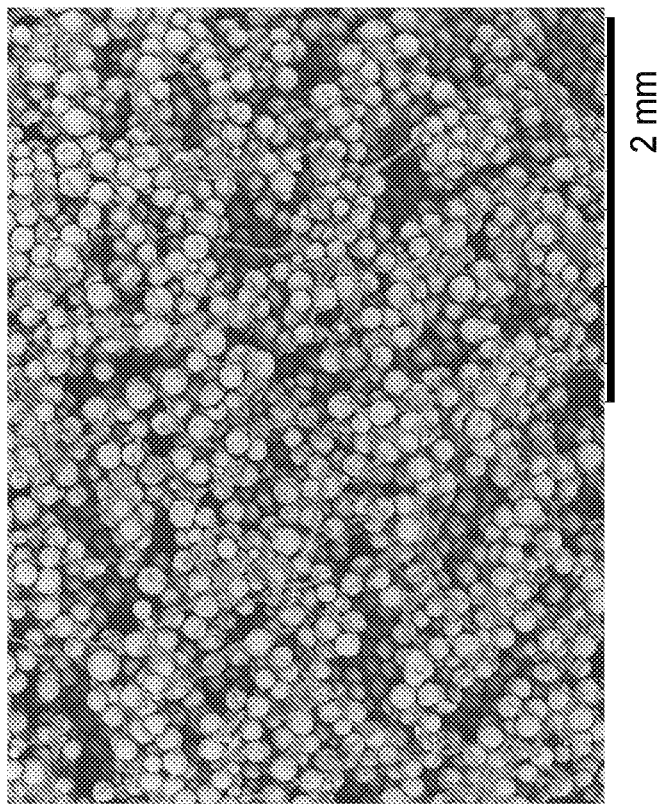
FIG. 7A is an electron micrograph of the foam of Example 1 containing BAK 120 (D10 is 98 micrometers) as the filler and FIG. 7B is an electron micrograph of the foam of Comparative Example 1 containing BAK 40 (D10 is 33 micrometers) as the filler.
Figure 7B:
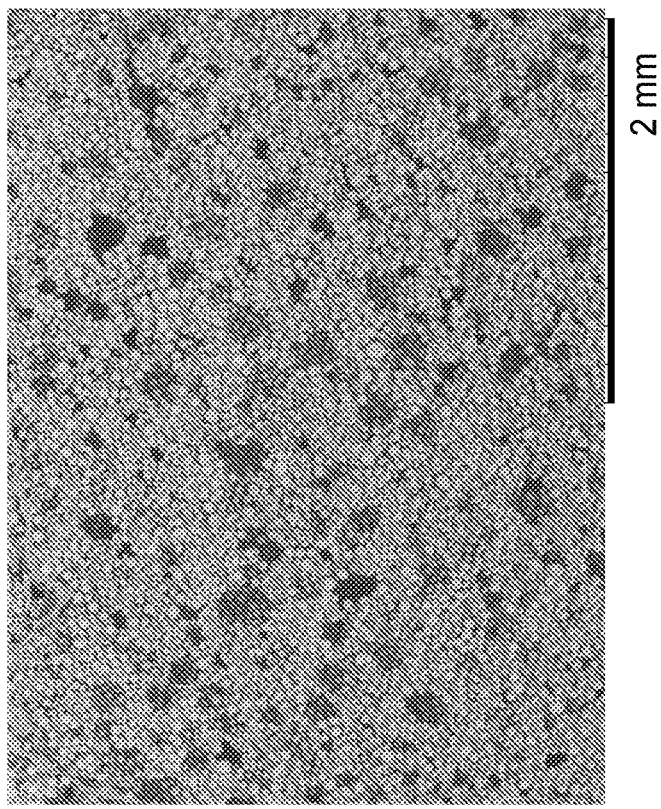

Often, the filler size is selected based on its aspect ratio and/or circularity. Larger average particle sizes are needed when the aspect ratio is in a range of 1.1 to 1.35 and/or the circularity is in a range of 0.70 to less than 0.80 then when the aspect ratio is in a range of 1 to less than 1.1 and/or the circularity is in a range of 0.80 to 1.0. That is, a spherical filler can have a smaller particle size than a roundish filler as illustrated in FIG. 2.

For spherical filler particles having an aspect ratio in a range of 1.0 to less than 1.1 and/or having a circularity in a range of 0.80 to 1.0, at least 90 percent of the filler particles typically have a size (D10 size) that is greater than 50 micrometers. D10 can be greater than 60 micrometers, greater than 70 micrometers, greater than 80 micrometers, greater than 90 micrometers, greater than 100 micrometers, greater than 150 micrometers, greater than 200 micrometers, greater than 300 micrometers, greater than 400 micrometers, or greater than 500 micrometers and can be up to 1000 micrometers, up to 800 micrometers, up to 600 micrometers, up to 500 micrometers, up to 300 micrometers, or up to 200 micrometers.

For roundish filler particles that have an aspect ratio in a range of 1.1 to 1.35 and/or having a circularity in a range of 0.70 to less than 0.80, at least 90 percent of the filler particles typically have a size (D10 size) that is greater than 100 micrometers. The D10 size can be greater than 120 micrometers, greater than 150 micrometers, greater than 200 micrometers, greater than 300 micrometers, greater than 400 micrometers, or greater than 500 micrometers and can be up to 1000 micrometers, up to 800 micrometers, up to 600 micrometers, up to 500 micrometers, up to 300 micrometers, or up to 200 micrometers.

The filler particles can be of any desired composition provided the shape is spherical or roundish. In many embodiments, the filler particles are inorganic materials such as inorganic oxides (i.e., metal oxides), inorganic hydroxides (i.e., metal hydroxides), inorganic carbides (i.e., metal carbides), inorganic nitrides (i.e., metal nitrides), and metals or alloys. Example metal oxides, metal hydroxides, metal carbides, and metal nitrides include, but are not limited to, various glass compositions, alumina, silica, beryllia, zirconia, magnesium oxide, titanium dioxide, aluminum titanate, silicon carbide, boron carbide, silica nitride, aluminum nitride, titanium nitride, aluminum trihydrate (ATH), magnesium hydroxide (MDH), and the like. Example metals or alloys include, but are not limited to, bronze, copper, nickel, iron, chromium, steel, and the like. Combinations of these fillers can be used.

In many embodiments, the fillers are selected to be thermally conductive. Thermally conductive fillers usually have a thermal conductivity of at least 1 Watt/meter-K. In some embodiments, the thermal conductivity is at least 5, at least 10, at least 20, at least 50, or at least 100 Watts/meter-K and can be up to 1000 or more, up to 500, up to 400, up to 200, up to 100, or up to 50 Watts/meter-K.

Optional Components

Other optional components can be present in the reaction mixture. Examples of optional components include, for example, antioxidants, flame retardants, dyes, pigments, antimicrobial agents, antistatic agents, foam cell stabilizing surfactants, dispersants, surface modifying agents, coupling agents, and ultraviolet light stabilizers.

Example antioxidants are commercially available from BASF (Florham Park, N.J., USA) under the trade designation IRGANOX.

Example flame retardants can be based on organic phosphinates such as those commercially available from Clariant (Charlotte, N.C., USA) under the trade designation EXOLIT (e.g., EXOLIT OP 1311, EXOLIT OP 1312, and EXOLIT OP1314).

Examples of surfactants that can be used in the reaction mixture include silicone surfactants, fluorinated surfactants, and organic surfactants. Examples of silicone surfactants include those commercially available under the trade designation DOWSIL from Dow Chemical (Midland, Mich., USA) such as DOWSIL 1250, DOWSIL SH 190 Fluid, DOWSIL SH 192 Fluid. Examples of fluorinated surfactants include those commercially available from Dynax Fluorochemicals under the trade designation DX4005N, which is an anionic surfactant. Suitable organic surfactants are available from Sigma-Aldrich (otherwise known as Millipore Sigma (Saint Louis, Mo., USA)) including, for example, alkyl alcohol polyalkylene oxide adducts such as methoxy poly(ethylene glycol), polyethylene glycol dodecyl ether, polyethylene glycol octadecyl ether, and the like. Other organic surfactants are commercially available from Croda (Snaith, UK) under the trade designation CRODAMIDE (e.g., CRODAMIDE ER, which is (Z)-13-docosenamide).

Dispersants can be used to improve the processing of the reaction mixture and to facilitate filler loading. Dispersants such as those available under the trade designation DISPERBYK (e.g., DISPERBYK 111, DISPERBYK 161, and DISPERBYK 183) from BYK Chemie (Wallingford, Conn., USA) can be used. Other useful dispersants are available from Lubrizol (Wickliffe, Ohio, USA) under the trade designation SOLSPERSE (e.g., SOLSPERSE 85000 and SOLSPERSE W100) and under the trade designation SOLPLUS (e.g., SOLPLUS D565 and SOLPLUS K240).

Surface modifying agents can be used to improve the wettability and/or dispersibility of the filler in the other components of the reaction mixture. Some of the surface modifying agents have a polymerizable group and can be classified as coupling agents that chemically link the filler to the polymeric material. The surface modifying agent is often a silane. Some example silanes are alkyl trialkoxysilanes such as methyltrimethoxysilane, methyltriethoxysilane, ethyltrimethoxysilane, ethyltriethoxysilane, n-propyltrimethoxysilane, n-propyltriethoxysilane, propyltrimethoxysilane, i-propyltriethoxysilane, butyltriethoxysilane, butyltriethoxysilane, hexyltrimethoxysilane, octyltrimethoxysilane, n-octyltriethoxysilane, and isooctyltrimethoxysilane. Other silanes are dialkyldialkoxysilane, trialkylalkoxysilane, alkyltrichlorosilanes, dialkyldichlorsilanes, and trialkylchlorosilanes. Additional example silanes are aryltrialkoxy silanes such as phenyltriethoxysilane Silanes with a vinyl polymerizable group include, for example, vinyltrimethoxysilane, vinyldimethylethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri(t-butoxy) silane, vinyltris(isobutoxy) silane, vinyltris(isopropenoxy) silane, and vinyltris(2-methoxyethoxy)silane. Silanes with a (meth)acrylolyloxy polymerizable group include, for example, 3-(methacryloyloxy)propyltrimethoxysilane. 3-acryloyloxypropyltrimethoxysilane, 3-(methacryloyloxy) propyltriethoxysilane, 3-(methacryloyloxy)propylmethyldimethoxysilane, 3-(acryloyloxypropyl)methyldimethoxysilane, 3-(methacryloyloxy)propyldimethylethoxysilane. 3-(methacryloyloxy)methyltriethoxysilane. 3-(methacryloyloxy)methyltrimethoxysilane, 3-(methacryloyloxy)propyldimethylethoxysilane, 3-(methacryloyloxy)propenyltrimethoxysilane, and 3-(methacryloyloxy)propyltrimethoxysilane.

The reaction mixture typically does not include a tackifier. A tackifier could negatively impact the recovery of the foam after being compressed. That is, the tackifier could cause the compressed foam to adhere to itself and not recover after being compressed.

The reaction mixture can optionally include a plasticizer. Plasticizers are typically organic solvents added to a polymeric system to increase or add flexibility and/or to decrease brittleness. Such a plasticizer might also be added if the viscosity of the di(meth)acrylate is too high. However, care is needed to ensure that the amount of plasticizer does not lower the viscosity of the reaction mixture to the point where the filler particles are not suspended in the polymerizable composition. If added, any plasticizer is selected so that it is miscible with the monomers in the polymerizable composition. If the plasticizer is volatile, it can be removed (e.g., evaporated) after polymerization.

If any of these optional components are present, they are typically present in a total amount no greater than 10 grams per 100 grams of the polymerizable composition (i.e., the amount is in a range of 0 to 10 grams per 100 grams of the polymerizable composition). The amount is often no greater than 8 grams, no greater than 6 grams, no greater than 4 grams, no greater than 1 grams, or no greater than 1 gram per 100 grams of the polymerizable composition.

Overall Reaction Mixture Composition

The reaction mixture usually contains a polymerizable composition, an azo compound, and a filler. Other optional components can be included as described above. More particularly, the polymerizable composition contains 30 to 70 weight percent urethane di(meth)acrylate and 30 to 70 weight percent of a monomer having a single ethylenically unsaturated group. These amounts are based on a total weight of the polymerizable composition. The reaction mixture further contains an azo compound in an amount of 20 to 70 grams per 100 grams of the polymerizable composition. The filler is present in an amount of 60 to 80 volume percent based on a total volume of the polymerizable composition plus filler.

In some example reaction mixtures, the polymerizable composition contains 40 to 70 weight percent urethane di(meth)acrylate and 30 to 60 weight percent of the monomer having a single ethylenically unsaturated group. These amounts are based on the total weight of the polymerizable composition. The reaction mixture further contains an azo compound in an amount of 30 to 70 grams per 100 grams of the polymerizable composition. The filler is present in an amount of 60 to 80 volume percent based on a total volume of the polymerizable composition plus filler.

In other example reaction mixtures, the polymerizable composition contains 40 to 60 weight percent urethane di(meth)acrylate and 40 to 60 weight percent of the monomer having a single ethylenically unsaturated group. These amounts are based on the total weight of the polymerizable composition. The reaction mixture further contains an azo compound in an amount of 40 to 70 grams per 100 grams of the polymerizable composition. The filler is present in an amount of 60 to 80 volume percent based on a total volume of the polymerizable composition plus filler.

Foam and Articles Containing the Foam

A foam and an article containing a foam are provided. The foam contains a product of the reaction mixture described above. That is, the foam contains a) a polymeric material comprising a reaction product of a polymerizable composition and b) a filler in an amount of at least 60 volume percent based on a total volume of the polymeric material plus filler. The filler is usually distributed uniformly throughout the foam. The foam has a void volume of 25 to 50 volume percent based on a total volume of the foam in an uncompressed state. The voids are usually distributed throughout the polymeric material in the foam.

The polymerizable composition is the same as described for the reaction mixture. The urethane di(meth)acrylate having a number average molecular weight of 5,000 to 20,000 Daltons provides a polymeric material network that is suitable for a foam that can be compressed and then recover from the compression. The polymeric material is typically flexible and elastomeric. The polymeric material is typically not a pressure-sensitive adhesive (e.g., it is not tacky).

The filler particles are selected so that the foam has relatively large interstitial spaces between filler particles. While not wishing to be bound by theory, spherical filler particles with a larger diameter (such as having a D10 size greater than 50 micrometers) tend to have a larger interstitial space than spherical particles with a smaller diameter. As shown diagrammatically in FIG. 1, the larger filler particles have diameter that is two times greater than the smaller filler particles. The larger particles typically have larger interstitial regions. Foams containing the larger spherical particles usually have a larger void volume than foams containing the smaller spherical particles. The voids in the foam are frequently located in the interstitial regions between the filler particles.

The aspect ratio of the filler particles can influence the interstitial volume. To provide the same interstitial volume, the particle size typically must increase as the aspect ratio increases and/or the circularity decreases as shown diagrammatically in FIG. 2. Thus, if the filler particles are spherical with the aspect ratio in a range of 1.0 to less than 1.1 and/or the circularity in a range of 0.80 to 1.0, at least 90 percent of the filler particles usually have a largest dimension that is greater than 50 micrometers (i.e., D10 is 50 micrometers or greater). If the filler particles are roundish with the aspect ratio in a range of 1.1 to 1.35 and/or the circularity in a range of 0.70 to less than 0.80, however, at least 90 percent of the filler particles usually have a largest dimension that is greater than 100 micrometers (D10 is 100 micrometers or greater). This is illustrated in FIG. 2 where the interstitial volumes are comparable for the smaller spherical particles and the larger roundish particles having a plurality of protrusions or asperities.

The foams can be formed in any suitable manner. In some embodiments, the reaction mixture is positioned in a mold and then heated. The temperature needs to be sufficiently high to activate the azo compound. When activated by heating, the azo compound forms free radicals to initiate polymerization of the polymerizable composition and generates nitrogen gas. The temperature is often at least 80° C., at least 90° C., or at least 100° C. and can be up to 150° C., up to 140° C., up to 130° C., or up to 120° C. The maximum temperature that can be used is often determined by the polymerizable composition. If the temperature is too high, some of the monomer may volatilize prior to polymerization.

The foams typically have a void volume in the range of 20 to 50 volume percent based on the volume of the foam. The void volume is at least 20 volume percent, at least 25 volume percent, at least 30 volume percent, or at least 35 volume percent and can be up to 50 volume percent, up to 45 volume percent, up to 40 volume percent, or up to 35 volume percent. The voids are usually distributed throughout the polymeric material of the foam.

The foam has good compressibility. For example, the foam can typically be compressed by at least 40 percent of its initial height with an applied force of 50 pounds per square inch (345 kPa) (e.g., when pressure is applied for at least 10 seconds). Stated differently, the foam has an uncompressed first height that decreases at least 40 percent to a compressed second height when the foam is subjected to an applied pressure of 50 pounds per square inch (e.g., when the pressure is applied for 10 seconds). The compressibility can be at least 45 percent, at least 50 percent, at least 55 percent, at least 60 percent, or at least 65 percent and can be up to 70 percent or more, up to 65 percent, up to 60 percent, up to 55 percent, or up to 50 percent with an applied pressure of 50 pounds per square inch (345 kPa) for 10 seconds.

The foam can recover after being compressed. The compression recovery is measured as the compression set as described in ASTM D1056 (2014).

Compression set=100*[($t_0$−$t_1$)/($t_0$−$t_s$)]

In this equation, $t_0$ refers to the thickness of the original foam (before compression), $t_1$ refers to the foam thickness after testing (after removal of the applied pressure), and $t_s$ is the thickness of the foam during compression (when the foam is subjected to the applied pressure). In the Example section, the foam was compressed to 50±1 percent of its height for 22±0.5 hours using a spacer; the thickness of the spacer is equal to $t_s$. The thickness $t_1$ was measured 30±5 minutes after removal of the applied pressure. The measurements were done at room temperature. Using this test procedure, the compression set is typically no greater than 40 percent. In some embodiments, the compression set was no greater than 35 percent, no greater than 30 percent, no greater than 25 percent, no greater than 20 percent, no greater than 15 percent, or no greater than 10 percent. The lower the compression set, the better the recovery.

In some embodiments, the filler is a thermally conductive material and the resulting foam is thermally conductive. That is, the foam has a thermal conductivity of at least 0.3 Watts/meter-K when the foam is compressed five percent. The thermal conductivity can be at least 0.5, at least 0.6, at least 0.8, or at least 1 Watts/meter-K. The thermal conductivity typically increases with increased compression. For example, the thermal conductivity is often at least 0.5 Watts/meter-K when the foam is compressed 50 volume percent.

An article is provided that includes the foam described above. The foam can have any desired size and shape. The foam may be the only component of the article or the article may contain one or more additional components. In some example articles, a second layer may be provided such as, for example, an adhesive layer (e.g., a pressure-sensitive adhesive layer) for attachment of the foam to a substrate. The adhesive layer may optionally be thermally conductive. There can be a single adhesive layer (such as on a first surface of the foam) or there can be two adhesive layers positioned on opposite surfaces of the foam. Multiple layers of the foam may be used. The multiple layers can be laminated together with an adhesive layer.

When the filler is thermally conductive, the foams or foam-containing articles can be used for thermal management applications. For example, the foam or foam-containing article can be used to dissipate heat from various heat generating components or devices. The foam can be positioned between the heat generating component or device and a heat sink. In some applications, the foams can be used to manage heat generated from electronic (or electrical) components and devices.

Various embodiments are provided that include a reaction mixture for preparing a foam, the resulting foam, and an article containing the foam.

Embodiment 1A is a reaction mixture that can be used to form a foam. The reaction mixture contains a) a polymerizable composition, b) an azo compound that is a free radical generator and that generates nitrogen gas when heated, and c) a filler. The polymerizable composition contains 1) a urethane di(meth)acrylate in an amount of 30 to 70 weight percent based on a total weight of the polymerizable composition and 2) at least one monomer having a single (meth)acryloyl group in an amount of 30 to 70 weight percent based on the total weight of the polymerizable composition. The urethane di(meth)acrylate, which has a number average molecular weight of at least 5000 grams/mole, has a hydrophobic group selected from an olefinic group with at least 12 carbon atoms or from a carbocyclic aromatic group. The azo compound is present in an amount of 20 to 70 grams per 100 grams of the polymerizable composition. The filler is present in an amount of at least 60 volume percent based on a total volume of the polymerizable composition and filler. The filler is spherical or roundish and has a circularity greater than 0.70. At least 90 percent of the filler has a longest dimension greater than 50 micrometers.

Embodiment 2A is the reaction mixture of embodiment 1A, wherein urethane di(meth)acrylate has a glass transition temperature (Tg) in a range of −60° C. to −20° C. as measured for the corresponding homopolymer with Differential Scanning calorimetry.

Embodiment 3A is the reaction mixture of embodiment 1A or 2A, wherein the urethane di(meth)acrylate has a number average molecular weight (Mn) in a range of 5,000 to 20,000 Daltons.

Embodiment 4A is the reaction mixture of any one of embodiments 1A to 3A, wherein the urethane di(meth)acrylate is an aromatic polyester urethane di(meth)acrylate.

Embodiment 5A is the reaction mixture of any one of embodiments 1A to 3A, wherein the urethane di(meth)acrylate is an aliphatic urethane di(meth)acrylate having a hydrocarbon segment with at least 12 carbon atoms.

Embodiment 6A is the reaction mixture of any one of embodiments 1A to 5A, wherein the polymerizable composition contains 0 to less than 5 weight percent of a monomer having more than two ethylenically unsaturated groups.

Embodiment 7A is the reaction mixture of any one of embodiments 1A to 5A, wherein the polymerizable composition contains 0 to less than 5 weight percent of a di(meth)acrylate having a number average molecular weight less than 500 Daltons.

Embodiment 8A is the reaction mixture of any one of embodiments 1A to 5A, wherein the monomer having a single ethylenically unsaturated group is an alkyl (meth)acrylate or heteroalkyl (meth)acrylate.

Embodiment 9A is the reaction mixture of any one of embodiments 1A to 8A, wherein the monomer having a single ethylenically unsaturated group is a urethane (meth)acrylate.

Embodiment 10A is the reaction mixture of any one of embodiments 1A to 9A, wherein the azo compound is of Formula (I).

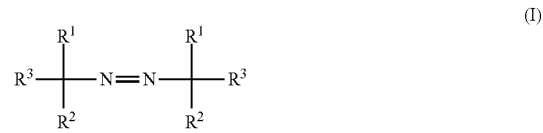

In Formula (I), each $R^1$ is independently an alkyl, each $R^2$ is independently an alkyl, and each $R^3$ is independently —CN, a group of formula —(C=O)—$OR^4$ where $R^4$ is an alkyl, a group of formula —(C=O)NH—$R^5$—OH where $R^5$ is an alkylene, a heterocyclic having 5 or 6 ring members and at least one nitrogen heteroatom, a group of formula —(C=NH)—NH—R⁶—(C=O)—OH where $R^6$ is an alkylene, or —(C=NH)—NH$_2$.

Embodiment 11A is the reaction mixture of embodiment 10A, wherein the azo compound is 2,2'-azobis(2,4-dimethylpentanenitrile).

Embodiment 12A is the reaction mixture of any one of embodiments 1A to 11A, wherein at least 90 percent of the filler has a longest dimension that is no greater than 1 millimeter. Embodiment 13A is the reaction mixture of any one of embodiments 1A to 12A, wherein the circularity of the filler is in a range of 0.70 to 1.0.

Embodiment 14A is the reaction mixture of any one of embodiments 1A to 13A, wherein the aspect ratio of the filler is in a range of 1.0 to 1.35.

Embodiment 15A is the reaction mixture of any one of embodiments 1A to 14A, wherein the filler is spherical.

Embodiment 16A is the reaction mixture of embodiment 15A, wherein the filler that is spherical has a circularity in a range of 0.8 to 1.0 and an aspect ratio in a range of 1.0 to less than 1.1.

Embodiment 17A is the reaction mixture of any one of embodiments 1A to 14A, wherein the filler is roundish.

Embodiment 18A is the reaction mixture of embodiment 16A, wherein the filler that is roundish has a circularity in a range of 0.7 to less than 0.8 and an aspect ratio in a range of 1.1 to 1.35.

Embodiment 19A is the reaction mixture of embodiment 18A, wherein at least 90 percent of the filler has a longest dimension greater than 100 micrometers.

Embodiment 20A is the reaction mixture of any one of embodiments 1A to 19A, wherein the filler is a thermally conductive filler.

Embodiment 21A is the reaction mixture of any one of embodiments 1A to 20A, wherein the filler is present in a range of 60 to 80 volume percent based on the total volume of the polymerizable composition plus filler.

Embodiment 22A is the reaction mixture of any one of embodiments 1A to 21A, wherein the filler is an inorganic material.

Embodiment 23A is the reaction mixture of embodiment 22A, wherein the inorganic material is an inorganic oxide, inorganic hydroxide, inorganic nitride, inorganic carbide, metal, or alloy.

Embodiment 24A is the reaction mixture of any one of embodiments 1A to 23A, wherein the reaction mixture a) a polymerizable composition containing 30 to 70 weight percent urethane di(meth)acrylate and 30 to 70 weight percent of the monomer having the single ethylenically unsaturated group based on the total weight of the polymerizable composition, b) an azo compound in an amount of 20 to 70 grams per 100 grams of the polymerizable composition, and c) a filler in an amount of 60 to 80 volume percent based on a total volume of the polymerizable composition plus filler.

Embodiment 25A is the reaction mixture of any one of embodiments 1A to 24A, wherein the reaction mixture a) a polymerizable composition containing 40 to 70 weight percent urethane di(meth)acrylate and 30 to 60 weight percent of the monomer having the single ethylenically unsaturated group based on the total weight of the polymerizable composition, b) an azo compound in an amount of 30 to 70 grams per 100 grams of the polymerizable composition, and c) a filler in an amount of 60 to 80 volume percent based on a total volume of the polymerizable composition plus filler.

Embodiment 26A is the reaction mixture of any one of embodiments 1A to 25A, wherein the reaction mixture a) a polymerizable composition containing 40 to 60 weight percent urethane di(meth)acrylate and 40 to 60 weight percent of the monomer having the single ethylenically unsaturated group based on the total weight of the polymerizable composition, b) an azo compound in an amount of 40 to 70 grams per 100 grams of the polymerizable composition, and c) a filler in an amount of 60 to 80 volume percent based on a total volume of the polymerizable composition plus filler.

Embodiment 1B is a foam that contains a) a polymeric material comprising a reaction product of a polymerizable composition and b) a filler in an amount of at least 60 volume percent based on a total volume of the polymeric material plus filler. The polymerizable composition contains 1) a urethane di(meth)acrylate in an amount of 30 to 70 weight percent based on a total weight of the polymerizable composition and 2) at least one monomer having a single (meth)acryloyl group in an amount of 30 to 70 weight percent based on the total weight of the polymerizable composition. The urethane di(meth)acrylate, which has a number average molecular weight of at least 5000 grams/mole, has a hydrophobic group selected from an olefinic group with at least 12 carbon atoms or from a carbocyclic aromatic group. The filler is present in an amount of at least 60 volume percent based on a total volume of the polymerizable composition and filler. The filler is spherical or roundish and has a circularity greater than 0.70. At least 90 percent of the filler has a longest dimension greater than 50 micrometers. The foam has a void volume of 25 to 50 volume percent based on a total volume of the foam in an uncompressed state.

Embodiment 2B is the foam of embodiment 1B, wherein urethane di(meth)acrylate has a glass transition temperature (Tg) in a range of −60° C. to −20° C. as measured for the corresponding homopolymer with Differential Scanning calorimetry.

Embodiment 3B is the foam of embodiment 1B or 2B, wherein the urethane di(meth)acrylate has a number average molecular weight (Mn) in a range of 5,000 to 20,000 Daltons.

Embodiment 4B is the foam of any one of embodiments 1B to 3B, wherein the urethane di(meth)acrylate is an aromatic polyester urethane di(meth)acrylate.

Embodiment 5B is the foam of any one of embodiments 1B to 3B, wherein the urethane di(meth)acrylate is an aliphatic urethane di(meth)acrylate having a hydrocarbon segment with at least 12 carbon atoms.

Embodiment 6B is the foam of any one of embodiments 1B to 5B, wherein the polymerizable composition contains 0 to less than 5 weight percent of a monomer having more than two ethylenically unsaturated groups.

Embodiment 7B is the foam of any one of embodiments 1B to 5B, wherein the polymerizable composition contains 0 to less than 5 weight percent of a di(meth)acrylate having a number average molecular weight less than 500 Daltons.

Embodiment 8B is the foam of any one of embodiments 1B to 5B, wherein the monomer having a single ethylenically unsaturated group is an alkyl (meth)acrylate or heteroalkyl (meth)acrylate.

Embodiment 9B is the foam of any one of embodiments 1B to 8B, wherein the monomer having a single ethylenically unsaturated group is a urethane (meth)acrylate.

Embodiment 10B is the foam of any one of embodiments 1B to 9B, wherein at least 90 percent of the filler has a longest dimension that is no greater than 1 millimeter.

Embodiment 11B is the foam of any one of embodiments 1B to 10B, wherein the circularity of the filler is in a range of 0.70 to 1.0.

Embodiment 12B is the foam of any one of embodiments 1B to 11B, wherein the aspect ratio of the filler is in a range of 1.0 to 1.35.

Embodiment 13B is the foam of any one of embodiments 1B to 12B, wherein the filler is spherical.

Embodiment 14B is the foam of embodiment 13B, wherein the filler that is spherical has a circularity in a range of 0.8 to 1.0 and an aspect ratio in a range of 1.0 to less than 1.1.

Embodiment 15B is the foam of any one of embodiments 1B to 12B, wherein the filler is roundish.

Embodiment 16B is the foam of embodiment 15B, wherein the filler that is roundish has a circularity in a range of 0.7 to less than 0.8 and an aspect ratio in a range of 1.1 to 1.35.

Embodiment 17B is the foam of embodiment 16B, wherein at least 90 percent of the filler has a longest dimension greater than 100 micrometers.

Embodiment 18B is the foam of any one of embodiments 1B to 17B, wherein the filler is a thermally conductive filler.

Embodiment 19B is the foam of any one of embodiments 1B to 18B, wherein the filler is present in a range of 60 to 80 volume percent based on the total volume of the polymerizable composition plus filler.

Embodiment 20B is the foam of any one of embodiments 1B to 19B, wherein the filler is an inorganic material.

Embodiment 21B is the foam of embodiment 20B, wherein the inorganic material is an inorganic oxide, inorganic hydroxide, inorganic nitride, inorganic carbide, metal, or alloy.

Embodiment 22B is the foam of any one of embodiments 1B to 21B, wherein the foam has an uncompressed first height that decreases at least 40 percent to a compressed second height when the foam is subjected to an applied pressure of 50 pounds per square inch (345 kPa).

Embodiment 23B is the foam of any one of embodiments 1B to 22B, wherein the compression set at room temperature is no greater than 40 volume percent.

Embodiment 24B is the foam of any one of embodiments 1B to 23B, wherein the polymeric material is elastomeric.

Embodiment 25B is the foam of any one of embodiments 1B to 24B, wherein the foam is not a pressure-sensitive adhesive.

Embodiment 26B is the foam of any one of embodiments 1B to 25B, wherein the filler is a thermally conductive filler and the foam has a thermal conductivity greater than 0.3 Watts/meter-K when compressed 5 volume percent based on a total volume of the foam.

Embodiment 1C is an article comprising a foam of any one of embodiment 1B to 26B.

Embodiment 2C is an article of embodiment 1C further comprising a second layer adjacent to the foam, the second layer comprising an adhesive.

Embodiment 3C is the article of embodiment 2C, wherein the adhesive is a pressure-sensitive adhesive.

Embodiment 4C is the article of embodiment 3C, wherein the pressure-sensitive adhesive is thermally conductive.

Embodiment 1D is a method of making a foam. The method includes preparing a reaction mixture as described in any one of embodiments 1A to 26A. The method further includes positioning the reaction mixture in a mold and heating the reaction mixture to a temperature sufficient to activate the azo compound within the reaction mixture, to form a polymeric material from the polymerizable material, and to form voids within the polymeric material.

EXAMPLES

Unless otherwise noted, all parts, percentages, ratios, etc. in the Examples and the rest of the specification are by weight. Unless otherwise indicated, all other reagents were obtained, or are available from fine chemical vendors such as Sigma-Aldrich Company (otherwise known as Millipore Sigma) (St. Louis, Mo., USA) or may be synthesized by known methods.

Materials

TABLE 1

| | | Fillers | | | | | |
|---|---|---|---|---|---|---|---|
| Name | Supplier (Location) | Description | D10 (µm) | D50 (µm) | D90 (µm) | Aspect Ratio | Circularity |
| BAK-5 | Bestry Performance Materials (Beijing, China) | Spherical alumina | 4.6 | 7.0 | 10.7 | 1.05 | 0.92 |
| BAK-40 | Bestry Performance Materials (Beijing, China) | Spherical alumina | 32.7 | 48.4 | 73.2 | 1.07 | 0.88 |
| BAK-70 | Bestry Performance Materials (Beijing, China) | Spherical alumina | 52.2 | 74.7 | 103.1 | 1.07 | 0.89 |
| BAK-120 | Bestry Performance Materials (Beijing, China) | Spherical alumina | 98.2 | 125.9 | 173.8 | 1.04 | 0.92 |
| P-0170 | Potters Industries (Malvern, PA, USA) | Glass beads | 307.8 | 366.2 | 432.0 | 1.08 | 0.9 |
| P-033 | Potters Industries (Malvern, PA, USA) | Glass beads | 548.1 | 633.6 | 728.2 | 1.01 | 0.98 |

TABLE 1-continued

Fillers

| Name | Supplier (Location) | Description | D10 (μm) | D50 (μm) | D90 (μm) | Aspect Ratio | Circularity |
|---|---|---|---|---|---|---|---|
| MagChem P98-30 | Martin Marietta Magnesia Specialties (Baltimore, MD, USA) | Magnesium oxide chunk | 163.1 | 611.8 | 1162.8 | 1.67 | 0.48 |
| B53 | Nippon Light Metal Holding Co. (Tokyo, Japan) | Roundish alumina trihydrate (ATH) | 12.9 | 50.0 | 81.0 | 1.5 | 0.55 |
| Dadco ATH-SH20 | Dadco (Plymouth, MI, USA) | Roundish ATH | 78.5 | 112.9 | 172.4 | 1.35 | 0.66 |
| DURALUM (Special White) | Washington Mills (North Grafton, MA, USA) | Alumina chunks (180 grits) | 46.3 | 75.0 | 94.5 | 1.68 | 0.51 |
| SB93C | Nippon Light Metal Holding Co. (Tokyo, Japan) | Roundish ATH | 102.3 | 140.5 | 197.1 | 1.25 | 0.75 |
| ExOne Bronze | ExOne (North Huntingdon, PA, USA) | Bronze beads | 95.9 | 184.5 | 261.5 | 1.32 | 0.82 |
| CFP 007HS | 3M Company (Saint Paul, MN, USA) | Boron nitride platelets | 4.7 | 7.0 | 10.2 | N/A | N/A |

TABLE 2

Monomers having a single (meth)acryloyl groups

| Name | Description | Tg (° C.) | Mw (g/mol) | Supplier (location) |
|---|---|---|---|---|
| 2-EHA | 2-ethylhexyl acrylate | −63.5 | 184.3 | BASF Corp. (Ludwigshafen, Germany) |
| IOA | Isooctyl acrylate | −53.1 | 184.3 | 3M Company (Saint Paul, MN, USA) |
| C8 alkyl acrylate | Isomer blend of octyl acrylate that can be prepared as described in WO 2011/119363 (Clapper et al.) | −42.8 | 184.3 | 3M Company (Saint Paul, MN, USA) |
| C12 alkyl acrylate | Isomer blend of dodecyl acrylate that can be prepared as described in WO 2011/119363 (Clapper et al.) | −48.7 | 240.4 | 3M Company (Saint Paul, MN, USA) |
| SR506C | Isobornyl acrylate (IBOA) | 88 | 208.3 | Sartomer Co., Inc. (Exton, PA, USA) |
| SR256 | 2-(2-ethoxyethoxy) ethyl acrylate | −50.6 | 188.2 | Sartomer Co., Inc. (Exton, PA, USA) |
| PL1104 | Isophoryl acrylate (3,3,5-trimethlcyclohexyl acrylate) | 40.2 | 196.3 | PL Industries, Ltd. (Essington, PA, USA) |
| IBA | Isobutyl acrylate | −22.1 | 128.2 | Alfa Aesar (Ward Hill, MA, USA) |
| G1122 | 2-[[(butylamino)carbonyl]oxy] ethyl acrylate | −3 | 215 | Rahn USA Corp. (Aurora, IL, USA) |

TABLE 3

Monomers having two or more (meth)acryloyl groups

| Name | Description | Functionality $f_A$ | Tg (° C.) | Mn (g/mol) | Mw (g/mol) | Supplier (location) |
|---|---|---|---|---|---|---|
| CN9070 | Hydrophobic aliphatic urethane diacrylate oligomer (hydrogenated vinyl butadiene backbone) | 2 | −47.4 | 7,334 | 12,652 | Sartomer (Exton, PA, USA) |
| CN972 | aromatic polyether based urethane triacrylate oligomer | 3 | −43.5 | 7,619 | 14,357 | Sartomer (Exton, PA, USA) |
| SR306F | tripropylene glycol diacrylate | 2 | 62 | 300.3 | 300.3 | Sartomer (Exton, PA, USA) |

TABLE 3-continued

| Monomers having two or more (meth)acryloyl groups | | | | | | |
|---|---|---|---|---|---|---|
| Name | Description | Functionality $f_A$ | Tg (° C.) | Mn (g/mol) | Mw (g/mol) | Supplier (location) |
| CN973A80 | aromatic polyester based urethane diacrylate oligomer blended with 20 wt-% SR306F, which is tripropylene glycol diacrylate | 2 + 2 | −24.5 | 7,569 | 14,368 | Sartomer (Exton, PA, USA) |
| CN973H85 | aromatic polyester based urethane diacrylate oligomer blended with 15 wt-% 5R256, which is 2-(2-ethoxyethoxy) ethyl acrylate | 2 + 1 | −30.8 | 6,577 | 15,273 | Sartomer (Exton, PA, USA) |
| CN973J75 | aromatic polyester based urethane diacrylate oligomer (same as in CN973J85) blended with 25 wt-% SR506C, which is isobornyl acrylate (IBOA) | 2 + 1 | −24 | 6,763 | 15,148 | Sartomer (Exton, PA, USA) |
| CN965 | aliphatic polyester based urethane diacrylate oligomer | 2 | −30.5 | 4,434 | 7,662 | Sartomer (Exton, PA, USA) |
| CN9071 | aliphatic polyester urethane diacrylate oligomer blended with 20 wt-% IBOA | 2 +1 | −27.2 | 14,476 | 34,579 | Sartomer (Exton, PA, USA) |
| CN966J75 | aliphatic polyester urethane diacrylate oligomer blended with 25 wt-% SR506C | 2 +1 | −24.7 | 7,430 | 16,964 | Sartomer (Exton, PA, USA) |
| CN9004 | aliphatic urethane diacrylate oligomer | 2 | −76.8 | 12,226 | 26,029 | Sartomer (Exton, PA, USA) |
| CN9021 | aliphatic polyester urethane diacrylate oligomer blended with 22 wt-% isophoryl acrylate (3,3,5-trimethyl-cyclohexyl acrylate) | 2 +1 | −57.7 | 18,436 | 43,905 | Sartomer (Exton, PA, USA) |

TABLE 4

| Azo Compound | | | |
|---|---|---|---|
| Name | Supplier/Origin | Description | Temperature 10 h $t_{1/2}$ (° C.) |
| VAZO 52 | The Chemours Company (Wilmington, DE, USA) | Chemical blowing agent and curing agent | 52 |

Test Methods
Particle Size and Shape Analysis

The particle size of the fillers was measured by laser diffraction using a HORIBA LA-950V2 or LA-960 (Horiba Instruments, Inc., Irvine, Calif.) in accordance with the ASTM standard test method for particle size distribution of metal powders and related compounds by light scattering (ASTM B 822, 2002). The optical model for the calculation used a refractive index of 1.660 for alumina, 1.760 for MgO, 1.510 for glass, 1.570 for ATH, and 1.333 for the solvent water. 1.800 was used for hexagonal boron nitride performed in isopropanol which has a refractive index of 1.3780. The fillers were added to the measurement cell, which was filled with water or isopropanol, until the transmittance was between the recommended levels of 85 percent to 95 percent. ExOne Bronze was similarly measured in water using a Microtrac S3500 (Montgomeryville, Pa., USA) with the absorbing/spherical model. The particle size distribution was calculated based on volume distribution and were summarized with the D10, D50, and D90 values. The D10 is the particle size such that 10 percent of the particles are smaller than or equal to this number. Similarly, the D50 is the particle size such that 50 weight percent of the particles are smaller than or equal to this number, otherwise referred to as the median size. Finally, D90 is the particle size such that 90 weight percent of the particles are smaller than or equal to this number.

Aspect ratios and circularities were determined by processing scanning electron microscopy images taken with a tabletop microscope TM3000 (Hitachi) at 15 kV with ImagePro Premier 9.3. The samples were deposited on double sided carbon tape and an air spray was used to decrease the density to enable image processing. The objects on the images were selected by thresholding as described in the count object tutorial of the software. The aspect ratio is then calculated as the ratio between the major axis and the minor axis of an ellipse equivalent to the object region. It is greater than or equal to 1, which is the expected aspect ratio value for a perfect circle or a square. Circularity is the ratio of the area of an object against that of a circle whose diameter is equal to the object's maximum Feret (i.e. longest dimension). The circularity value is between 0 and 1 where 1 describes a perfect circle and 0 a line.

Percent Void Volume

The percent void volume was calculated using the following equation.

$$\% \text{ Void Volume} = 100 * [1 - (D_1/D_0)]$$

In this equation, $D_1$ refers to the density of the foam and $D_0$ refers to the density of the reaction mixture prior to foaming. The density of the foam ($D_1$) was measured by dividing the weight of the foam in grams by the volume of the foam in milliliters (mL). The volume was calculated based on the geometry of the foam. The density prior to foaming was calculated by dividing the total weight of all components in grams by the total volume of all components in mL. This is shown in the following equation $$D_0 = \Sigma_{i=1}^{x}(wt)_i \div \Sigma_{i=1}^{x}(vol)_i$$

where the variable x is the total number of components and the variable i is the number of each component (e.g., component 1 up to component x) in the reaction mixture. $D_0$ is the summation of the weight (in grams) of all components (component 1 to component x) in the reaction mixture divided by the summation of the volume (in mL) of all components in the reaction mixture. The weight of each component is based on the reaction mixture composition. The volume of each component (component 1 to component x) can be calculated based on the density of the component (the density of a component is equal to the weight of the component in grams divided by the volume of the component in mL).

Percent Crosslink Density

The crosslink density is defined as the percent of the total ethylenically unsaturated bonds in the reaction mixture that can result in the formation of crosslinks in the resulting foam. The crosslink density can be defined using the following equation.

$$\% \text{ Crosslink Density} = 100 * (M_2/M_1)$$

In this equation, $M_2$ is the total number of moles of ethylenically unsaturated groups in monomers (including oligomers) having two or more ethylenically unsaturated groups and $M_1$ is the total number of moles of ethylenically unsaturated groups in monomers (including oligomers) having one or more ethylenically unsaturated groups. $M_1$ can be calculated using the following equation $$M_1 = \Sigma_{k=1}^{y}(f)_k(\text{moles})_k$$

where y is the number of monomers having one or more ethylenically unsaturated groups, k is the number of each monomer having one or more ethylenically unsaturated groups (i.e., monomer 1 to monomer y), f is the number of ethylenically unsaturated groups (e.g., (meth)acryloyl groups) for each monomer, and moles refers to the number of moles of each monomer in the polymerizable composition. $M_1$ is the summation of the functionality of each monomer (there are y such monomers) having one or more ethylenically unsaturated groups times the number of moles of that monomer. Likewise, $M_2$ can be calculated using the following equation $$M_2 = \Sigma_{j=1}^{z}(f)_j(\text{moles})_j$$

where z is the number of monomers having two or more ethylenically unsaturated groups, j is the number of each monomer having two or more ethylenically unsaturated groups (i.e., monomer 1 to monomer z), and f is the number of ethylenically unsaturated groups in each monomer having two or more ethylenically unsaturated groups, and moles refers to the number of moles of each monomer in the polymerizable composition that contains at least two ethylenically unsaturated groups. $M_2$ is the summation of the functionality of each monomer (there are z such monomers) having two or more ethylenically unsaturated groups times the number of moles of the monomer.

Compression and Compression Set

A texture analyzer, TA.XT Plus from Texture Technologies Corp. (Hamilton, Mass., USA), was used to measure the compressibility of the foamed samples at various forces, using a 25 millimeter (mm) wide and 35 mm tall acrylic cylindrical probe from Stable Micro Systems Ltd. (Hamilton, Mass., USA). During a relaxation test, the probe approached the sample at 1 mm/second and then, after measuring an applied pressure of 0.015 psi (100 Pa), the height of the sample was automatically recorded. The test continued with a probe speed of 3 mm/second such that the probe applied a continuous pressure of 10 psi (69 kPa) for 10 seconds. Percent compression is calculated using the following equation:

$$\% \text{ Compression} = [(t_0 - t_c) \div t_0] * 100$$

In this equation, $t_0$ is the original thickness of the foam in millimeters and $t_c$ is the compressed thickness of the foam in millimeters. The test was then repeated at 50 and 100 psi (345 kPa and 690 kPa, respectively) unless the sample showed obvious signs of degradation (such as cracks or no recovery from the previous test).

The compression set of a material is the permanent deformation remaining when a force (that was applied to it) is removed. Herein, ASTM D1056, 2014, sections 50 to 56 were followed except that the test was performed at room temperature. The foams were open cell; therefore, they were prepared to be at least 6.35 mm high and 1 inch (2.54 cm) in diameter. The test consists in placing the foam between two spacers that have a height that is 50±1% of the foam. The foam was compressed to the height of the spacer between two slabs for 22±0.5 hours and then released (e.g., the applied pressure was removed). The thickness of the sample was measured 30 minutes±5 minutes after the compression was released. The compression set was calculated from the following equation.

$$\% \text{ Compression set} = [(t_0 - t_1) \div (t_0 - t_s)] * 100$$

In this equation, $t_0$ is the original thickness of the foam in millimeters, $t_1$ is the thickness of the foam in millimeters after the specified recovery period (e.g., 30±5 minutes), and $t_s$ is the thickness in millimeters of spacer. The lower the number, the better the recovery after being compressed.

Thermal Conductivity

A Thermal Interface Materials Tester, TIM 1400 from Analysis Tech (Wakefield, Mass., USA) was used to measure the thermal impedance and provide the apparent thermal conductivity (which assumes minimal contact resistance) based on ASTM D5470, 2012, at 5 percent compression and 50 percent compression. Samples were die cut as 33 mm wide discs (i.e., the diameter of the samples used in the measurement was 33 mm). The sample temperature was set to 50° C. and the chiller setpoint at 18° C.

Gel Permeation Chromatography (GPC) The GPC equipment consisted of an e2695 Separation Module and a model 2414 differential refractive index detector, both from Waters Corporation (Milford, Mass., USA). The chromatograph was operated at a flow rate of 0.6 mL/min using tetrahydrofuran (THF) as the eluent. The GPC column was a HSPgel HR MB-M column also from Waters Corporation. The column compartment and differential refractive index detector were set to 35° C. The molecular weight standards were EasiVial PMMA from Agilent Technologies (Santa Clara, Calif.) The $M_p$ values of the PMMA molecular weight standards used in the calibration curve ranged from 550 Daltons (Da) to 1,568,000 Da.

Glass Transition Temperature

To measure the glass transition of the monomers used in the polymerizable composition to prepare the foams, homopolymers of the monomers were prepared. For monomers only available as a mixture, copolymers were prepared. The homopolymers or copolymers were not prepared in the presence of fillers. The monomer samples were mixed with 1 weight percent photoinitiator, which was bis(2,4,6-trimethylbenzoyl)-phenylphosphineoxide that is commercially available under the trade designation IRGACURE 819 from BASF Corporation, Vandalia, Ill., USA. The mixture was placed in a MAX20 speedmix cup and mixed using a centrifugal resin mixer FlackTek Speedmixer DAC 150 FV at 2500 rpm for 5 minutes to provide a homogeneous mixture. Both the mixing cup and the centrifugal mixer were obtained from FlackTek Incorporated (Landrum, S.C., USA). The compositions were coated between clear release liners (silicone release liner having a nominal thickness of 51 micrometers (0.002 inches), obtained from Dupont Teijin, Dupont Chemical Company (Wilmington Del., USA). The coatings were then exposed for 10 minutes under four Sylvania 350 black light F40/350BL/ECO 40 Watts light bulbs from Osram Sylvania (Wilmington, Mass., USA) to cure.

The glass transition temperature (Tg) was measured by differential scanning calorimetry (DSC). About 5 milligrams of each sample were placed in individual standard aluminum DSC pans (TA Instruments, Eden Prairie, Minn., product number T160309 for the pan and T160425 for the lid) and placed in the auto sampler of a dynamic scanning calorimeter (DSC Q200, TA Instruments). For each sample, pans containing the sample were individually placed on one of the differential posts in the DSC's enclosed cell along with an empty reference pan on the opposite post. Temperature was raised to 150° C. at 10° C./min under nitrogen atmosphere and held for 2 minutes to thermally anneal the sample then cooled down to −60° C. at the same rate, and annealed for 2 minutes before warming up again to 150° C. at 10° C./min. The Tg values were identified in the scanning profile of heat flow vs. temperature. Typically, a glass transition is generally represented by a shift in the profile slope upon heating as the heat capacity of the sample after the transition is altered. Tg was recorded at the inflection point of the curve associated with this shift in heat flow profile, also referred to as the midpoint temperature in ASTM E1356-08 (2014).

Nuclear Magnetic Resonance

Samples of the urethane di(meth)acrylates were analyzed as solutions of unknown concentration in deuterated chloroform. One-dimensional proton and $^{13}C$ NMR data were collected using a Varian Inova 600 MHz NMR spectrometer (Varian, Inc., Palo Alto, Calif.) equipped with an inverse probe head. Homo- and hetero-nuclear two-dimensional NMR data were also collected to confirm the spectral assignments. The residual proto-chloroform was used as a secondary chemical shift reference in the proton dimension while the deutero-chloroform was used as a secondary chemical shift in the carbon-13 dimension ($\delta$=77.0 ppm). All the NMR data was collected with the samples held at 25° C. The results are summarized below for each urethane di(meth)acrylate analyzed.

TABLE 5

NMR Analysis of Urethane Di(meth)acrylates

| Name | Summary of NMR data |
| --- | --- |
| CN9070 | Results consistent with a polyurethane diacrylate formed from hydroxyl terminated hydrogenated vinyl butadiene (it is similar to KRATON L-2203), isophorone diisocyanate, and capped with hydroxyethyl acrylate |
| CN972 | Results consistent with a polyester urethane diacrylate that is formed from toluene diisocyanate, polypropylene oxide, neopentyl glycol, adipic acid, and capped with hydroxyethyl acrylate |
| CN973H85 | Results consistent with a mixture of a monomer 2(2-ethoxyethoxy)ethyl acrylate (15 weight percent) and a polyester urethane diacrylate formed from toluene diisocyanate, adipic acid, neopentyl glycol, and capped with hydroxylethyl acrylate |
| CN965 | Results consistent with a polyester urethane diacrylate that is formed from adipic acid, neopentyl glycol, isophorone diisocyanate, and capped with hydroxyethyl acrylate |
| CN9071 | Results consistent with a mixture of a monomer (isobornyl acrylate, about 20 weight percent) and a polyester urethane diacrylate formed from adipic acid, neopentyl glycol, isophorone diisocyanate, and capped with hydroxyethyl acrylate |
| CN966J75 | Results consistent with a mixture of a monomer (isobornyl acrylate, about 25 weight percent) and a polyester urethane diacrylate formed from adipic acid, neopentyl glycol, isophorone diisocyanate, and capped with hydroxyethyl acrylate |
| CN9004 | Results consistent with a polyester urethane diacrylate with a polyether backbone that is formed from poly(tetramethylene oxide), 2-methylbutane-1,4-diol, isophorone diisocyanate, and capped with hydroxyethyl acrylate |
| CN9021 | Results consistent with a mixture of a monomer (3,3,5-trimethylcyclohexyl acrylate, about 22 weight percent) and a polyether urethane diacrylate formed from polypropylene oxide polyols, isophorone diisocyanate, and capped with hydroxyethyl acrylate |

EXAMPLES AND COMPARATIVE EXAMPLES

For all the examples and comparative examples, the monomers (e.g., the urethane di(meth)acrylates plus the monomers having a single ethylenically unsaturated group) were mixed with half the amount of filler by weight in a speedmix cup (MAX40 mixing cup) using a FlackTek Speedmixer DAC 150 FV operating at 3000 revolutions per minute (rpm) for 20 seconds. Both the speedmix cup and the speedmixer were obtained from FlackTek Incorporated (Landrum, S.C., USA). The azo compound was then added and mixed in by hand until the azo compound fully dissolved. Then the remaining amount of filler was added and mixed at 3000 rpm for 4 seconds. The resulting mixture was poured into a 3.3 centimeters (cm) wide and 6 millimeters (mm) high circular rubber mold on a Teflon sheet in a glass dish. The dish was placed in an oven set at 120° C. for 10 minutes then the sample was flipped (when possible) and left in the oven for another 5 minutes. Samples were left to cool down to room temperature (RT) before being tested.

Examples 1-6

A polymerizable composition was prepared for each example that contained 50 weight percent 2-EHA, 38.6 weight percent CN973H85, and 11.4 weight percent PL1104 based on a total weight of the polymerizable composition. The crosslink density was 2.7 percent. Then, 45.4 grams of VAZO 52 was added for 100 grams of the polymerizable composition. Various spherical or roundish fillers were added as identified in Table 6. All the examples contained 70 volume percent filler based on the total volume of the polymerizable composition and the filler.

The percent void volume, percent compression at 50 psi (345 kPa), percent compression set performed at room temperature, and the thermal conductivity are shown in Table 6.

Examples 7-9

A polymerizable composition was prepared for each example that contained 50 weight percent 2-EHA, 38.6 weight percent CN973H85, and 11.4 weight percent PL1104 based on a total weight of the polymerizable composition. The crosslink density was 2.7 percent. Then, 45.4 grams of VAZO 52 was added for 100 grams of the polymerizable composition. All the examples contained 60 volume percent BAK-120 and 10 volume percent of another filler: BAK-5 (spherical) in Example 7, MagChem P98-30 (chunks) in Example 8, and CFP 007HS (platelets) in Example 9. The volume percent filler is based on the total volume of the filler and polymerizable composition.

The percent void volume, percent compression at 50 psi (345 kPa), percent compression set performed at room temperature, and the thermal conductivity are shown in Table 6.

Examples 10-11

A polymerizable composition was prepared for each example that contained 50 weight percent 2-EHA, 38.6 weight percent CN973H85, and 11.4 weight percent PL1104 based on a total weight of the polymerizable composition. The crosslink density was 2.7 percent. Then, 45.4 grams of VAZO 52 was added for 100 grams of the polymerizable composition. Both examples contained 35 volume percent BAK-120 and 35 volume percent of another filler: SB93C in Example 10 and BAK-70 in Example 11. The volume percent filler is based on the total volume of the filler and polymerizable composition.

The percent void volume, percent compression at 50 psi (345 kPa), percent compression set performed at room temperature, and the thermal conductivity are shown in Table 6.

Example 12

A polymerizable composition was prepared that contained 50 weight percent 2-EHA, 38.6 weight percent CN973H85, and 11.4 weight percent PL1104 based on a total weight of the polymerizable composition. The crosslink density was 2.7 percent. Then, 45.4 grams of VAZO 52 was added for 100 grams of the polymerizable composition. The example contained 75 volume percent BAK-120 based on the total volume of filler and polymerizable composition.

The percent void volume, percent compression at 50 psi (345 kPa), percent compression set performed at room temperature, and the thermal conductivity are shown in Table 6.

Example 13

A polymerizable composition was prepared that contained 50 weight percent CN973H85 and 50 weight percent 2-EHA based on a total weight of the polymerizable composition. The crosslink density was 4.0 percent. Then, 21.4 grams of VAZO 52 was added for 100 grams of the polymerizable composition. The example contained 60 volume percent BAK-120 based on the total volume of filler and polymerizable composition.

The percent void volume, percent compression at 50 psi (345 kPa), percent compression set performed at room temperature, and the thermal conductivity are shown in Table 6.

Comparative Examples 1-3

A polymerizable composition was prepared that contained 50 weight percent 2-EHA, 38.6 weight percent CN973H85, and 11.4 weight percent PL1104 based on a total weight of the polymerizable composition. The crosslink density was 2.7 percent. Then, 45.4 grams of VAZO 52 was added for 100 grams of the polymerizable composition. These comparative examples contained 70 volume percent filler based on the total volume of filler and polymerizable composition. The filler was BAK-40 (D10 less than 50 micrometer) in Comparative Example, 1, MagChem P98-30 (chunks) in Comparative Example 2, and B53 (circularity less than 0.80) in Comparative Example 3.

The percent void volume, percent compression at 50 psi (345 kPa), percent compression set performed at room temperature, and the thermal conductivity are shown in Table 6.

Comparative Example 4

A polymerizable composition was prepared that contained 50 weight percent 2-EHA, 38.6 weight percent CN973H85, and 11.4 weight percent PL1104 based on a total weight of the polymerizable composition. The crosslink density was 2.7 percent. Then, 56.8 grams of VAZO 52 was added for 100 grams of the polymerizable composition. This comparative example contained 70 volume percent DURALUM filler (chunks) based on the total volume of filler and polymerizable composition.

The percent void volume, percent compression at 50 psi (345 kPa), percent compression set performed at room temperature, and the thermal conductivity are shown in Table 6.

Comparative Example 5

A polymerizable composition was prepared that contained 50 weight percent 2-EHA, 38.6 weight percent CN973H85, and 11.4 weight percent PL1104 based on a total weight of the polymerizable composition. The crosslink density was 2.7 percent. Then, 51.1 grams of VAZO 52 was added for 100 grams of the polymerizable composition. This comparative example contained 70 volume percent Dadco ATH-SH20 (low circularity).

The percent void volume, percent compression at 50 psi (345 kPa), percent compression set performed at room temperature, and the thermal conductivity are shown in Table 6.

TABLE 6

Characterization of Examples 1-13 and Comparative Examples 1-5

| Ex or CEx | Filler | Filler amount (vol-%) | Void volume (vol-%) | Compression at 50 psi (345 kPa) (%) | Compression Set at RT (%) | Thermal conductivity at 5%/50% compression (W/m-K) |
|---|---|---|---|---|---|---|
| Ex1 | BAK-120 | 70 | 37 | 50.2 | 0 | 0.8/1.5 |
| Ex2 | BAK-70 | 70 | 27.2 | 42.3 | 6.7 | 0.6/1.6 |
| Ex3 | PT-0170 | 70 | 29.3 | 67.1 | 20.0 | 0.3/0.5 |
| Ex4 | P-033 | 70 | 30 | 59.8 | 0 | 0.4/0.5 |
| Ex5 | Exone Bronze | 70 | 37.8 | 44.6 | 7.9 | 0.6/1.3 |
| Ex6 | SB93C | 70 | 35.4 | 47.1 | 20.5 | 0.7/1.1 |
| Ex7 | BAK-120/ BAK-5 | 60/10 | 41.5 | 52.8 | 0 | N/A |
| Ex8 | BAK-120/ MagChem P98-30 | 60/10 | 45.9 | 55 | 28.4 | N/A |
| Ex9 | BAK-120/ BN007HS | 60/10 | 43.6 | 56.3 | 15.1 | 1.2/2.2 |
| Ex10 | BAK-120/ SB93C | 35/35 | 43.3 | 52 | 28.4 | N/A |
| Ex11 | BAK-120/ BAK-70 | 35/35 | 46 | 57.8 | 19.1 | N/A |
| Ex12 | BAK-120 | 75 | 37.5 | 50.6 | 21.6 | 1/N/A |
| Ex13 | BAK-120 | 60 | 36.8 | 44.7 | 0 | 0.5/1.2 |
| CEx1 | BAK-40 | 70 | 31.9 | 24.6 | 4.2 | N/A |
| CEx2 | MagChem P98-30 | 70 | 34 | 31.6 | 6.3 | 0.9/N/A |
| CEx3 | B53 | 70 | 28.4 | 33.7 | 9.3 | 0.7/1.3 |
| CEx4 | DURALUM | 70 | 41.1 | 25.8 | N/A | N/A |
| CEx5 | Dadco ATH-SH20 | 70 | 32.8 | 28.1 | N/A | N/A |

N/A means not analyzed

Examples 14-17

A polymerizable composition was prepared for each example that contained 50 weight percent of a monomer having a single ethylenically unsaturated group (C8 alkyl acrylate for Example 14, C12 alkyl acrylate for Example 15, isooctyl acrylate for Example 16 and isobutyl acrylate for Example 17), 38.6 weight percent CN973H85, and 11.4 weight percent PL1104 based on a total weight of the polymerizable composition. Then, 45.4 grams of VAZO 52 was added for 100 grams of the polymerizable composition. Each example contained 70 volume percent BAK-120 based on the total volume of filler and polymerizable composition.

The percent void volume, percent compression at 50 psi (345 kPa), and percent compression set performed at room temperature are shown in Table 7.

Example 18

A polymerizable composition was prepared that contained 34 weight percent CN9070 and 66 weight percent G1122 based on a total weight of the polymerizable composition. Then, 45.4 grams of VAZO 52 was added for 100 grams of the polymerizable composition. This example contained 70 volume percent BAK-120 based on the total volume of filler and polymerizable composition.

The percent void volume, percent compression at 50 psi (345 kPa), and percent compression set performed at room temperature are shown in Table 7.

Examples 19-20

A polymerizable composition was prepared for each example that contained 50 weight percent SR506C and 50 weight percent urethane di(meth)acrylate (CN973H85 for Example 19 and CN9070 for Example 20) based on a total weight of the polymerizable composition. Then, 45.4 grams of VAZO 52 was added for 100 grams of the polymerizable composition. Each example contained 70 volume percent BAK-120 based on the total volume of filler and polymerizable composition.

The percent crosslink density, the percent void volume, percent compression at 50 psi (345 kPa), and percent compression set performed at room temperature are shown in Table 7.

TABLE 7

Characterization of Examples 14-20

| Ex | Monomer mixture (wt-%) | Crosslink density (%) | Void volume (vol-%) | Compression at 10 psi (69 kPa) (%) | Compression at 50 psi (345 kPa) (%) | Compression Set at RT (%) |
|---|---|---|---|---|---|---|
| 14 | C8 alkyl acrylate/ CN973H85/ PL1104 (50/38.6/11.4) | 2.7 | 36.4 | 24.9 | 43.5 | 6.7 |
| 15 | C12 alkyl acrylate/ CN973H85/ PL1104 (50/38.6/11.4) | 3.2 | 40.4 | 30.7 | 50.3 | 0 |
| 16 | IOA/CN973H85/ PL1104 (50/38.6/11.4) | 2.7 | 36.6 | 27.9 | 50.2 | 26.5 |
| 17 | IBA/CN973H85/ PL1104 (50/38.6/11.4) | 2.0 | 33.8 | 14.9 | 41.9 | 25.1 |
| 18 | G1122/CN9070 (66/34) | 2.9 | 30.7 | 20.8 | 50.7 | 26.2 |
| 19 | CN973H85/ SR506C (50/50) | 4.4 | 37.0 | 21.0 | 43.0 | 13.5 |
| 20 | CN9070/SR506C (50/50) | 5.4 | 46.8 | 22.8 | 49.5 | 5.8 |

Examples 21-23 and Comparative Examples 6-12

A polymerizable composition was prepared for each example or comparative example that contained 50 weight percent 2-EHA and 50 weight percent of a monomer having at least two ethylenically unsaturated groups as shown in Table 8. The weight percent amounts are based on a total weight of the polymerizable composition. Then, 45.4 grams of VAZO 52 was added for 100 grams of the polymerizable composition. Each example or comparative example contained 70 volume percent BAK-120 based on the total volume of filler and polymerizable composition.

The percent void volume, percent crosslink density, percent compression at 10 psi (69 kPa), percent compression at 50 psi (345 kPa), percent compression at 100 psi (690 kPa), and percent compression set performed at room temperature are shown in Table 8.

Example 24

A polymerizable composition was prepared that contained 25 weight percent 2-EHA and 75 weight percent CN973H85. Then, 83 grams of VAZO 52 was added for 100 grams of the polymerizable composition. This example contained 70 volume percent BAK-120 based on the total volume of filler and polymerizable composition.

The percent void volume, percent crosslink density, percent compression at 10 psi (69 kPa), percent compression at 50 psi (345 kPa), percent compression at 100 psi (690 kPa), and percent compression set performed at room temperature are shown in Table 8.

TABLE 8

Characterization of Examples 21-24 and Comparative Examples 6-12

| Ex or CEx | Monomer with at least two (meth)acryloyl groups (wt-%) | Void volume (vol-%) | Crosslink density (%) | Compress at 10 psi (69 kPa) (%) | Compress at 50 psi (345 kPa) (%) | Compress at 100 psi (690 kPa) (%) | Compression Set at RT |
|---|---|---|---|---|---|---|---|
| Ex21 | CN9070 (50 wt-%) | 43.9 | 4.9 | 24.3 | 58 | 73 | 7.6 |
| Ex22 | CN973J75 (50 wt-%) | 40 | 3.2 | 21.8 | 50.1 | 71.4 | 36 |
| Ex23 | CN973H85 (50 wt-%) | 37.8 | 4.0 | 18 | 47.9 | 69.4 | 22.3 |
| Ex24 | CN973H85 (75 wt-%) | 47.3 | 9.0 | 24.1 | 55.1 | 70.1 | 0 |
| CEx6 | CN966J75 (50 wt-%) | 43.6 | 3.0 | 22.1 | 50.4 | 66.6 | 50.5 |
| CEx7 | CN973A80 (50 wt-%) | 43.8 | 22.1 | 7.5 | 22.4 | Break | N/A |
| CEx8 | CN972 (50 wt-%) | 35.9 | 6.8 | 7.1 | 15.2 | N/A | N/A |
| CEx9 | CN965 (50 wt-%) | 35.4 | 7.7 | 8.2 | 20.3 | Break | N/A |
| CEx10 | CN9004 (50 wt-%) | N/A | 2.9 | Too friable | | | |
| CEx11 | CN9021 (50 wt-%) | N/A | 1.3 | Doughy, too soft | | | |
| CEx12 | CN9071 (50 wt-%) | 44.9 | 1.7 | 52.7 | No recovery | | |

What is claimed is:

1. A reaction mixture for forming a foam, the reaction mixture comprising:
   a) a polymerizable composition comprising
      1) a urethane di(meth)acrylate in an amount of 30 to 70 weight percent based on a total weight of the polymerizable composition, the urethane di(meth)acrylate having a number average molecular weight of at least 5,000 grams/mole and having a hydrophobic group selected from an olefinic group with at least 12 carbon atoms or from a carbocyclic aromatic group;
      2) at least one monomer having a single (meth)acryloyl group in an amount of 30 to 70 weight percent based on a total weight of the polymerizable composition;
   b) an azo compound in an amount in a range of 45 to 70 grams per 100 grams of the polymerizable composition, wherein the azo compound is a free radical generator and generates nitrogen gas when heated; and
   c) a filler in an amount of at least 60 volume percent based on a total volume of the polymerizable composition plus filler, wherein the filler is spherical or roundish with a circularity greater than 0.70 and at least 90 percent of the filler has a longest dimension greater than 50 micrometers.

2. The reaction mixture of claim 1, wherein at least 90 percent of the filler has a longest dimension that is no greater than 1 millimeter.

3. The reaction mixture of claim 1, wherein the filler is a thermally conductive filler.

4. The reaction mixture of claim 1, wherein the filler is present in a range of 60 to 80 volume percent based on the total volume of the polymerizable composition plus filler.

5. The reaction mixture of claim 1, wherein the urethane di(meth)acrylate is an aromatic polyester urethane di(meth)acrylate.

6. The reaction mixture of claim 1, wherein the urethane di(meth)acrylate is an aliphatic urethane di(meth)acrylate having a hydrocarbon segment with at least 12 carbon atoms.

7. The reaction mixture of claim 1, wherein the azo compound is of Formula (I)

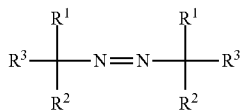

(I)

wherein
each $R^1$ is independently an alkyl;
each $R^2$ is independently an alkyl;
each $R^3$ is independently —CN, a group of formula —(C=O)—$OR^4$ where $R^4$ is an alkyl, a group of formula —(C=O)NH—$R^5$—OH where $R^5$ is an alkylene, a heterocyclic having 5 or 6 ring members and at least one nitrogen heteroatom, a group of formula —(C=NH)—NH—$R^6$—(C=O)—OH where $R^6$ is an alkylene, or —(C=NH)—$NH_2$.

8. The reaction mixture of claim 1, wherein the azo compound is 2,2'-azobis(2,4-dimethylpentanenitrile).

9. The reaction mixture of claim 1, wherein the filler is roundish with a circularity in a range of 0.70 to less than 0.8 and wherein at least 90 percent of the filler has a longest dimension greater than 100 micrometers.

10. The reaction mixture of claim 1, wherein the filler is spherical and has a circularity in a range of 0.8 to 1.0.

11. A foam comprising:
a) a polymeric material comprising a reaction product of a polymerizable composition comprising
1) a urethane di(meth)acrylate in an amount of 30 to 70 weight percent based on a total weight of the polymerizable composition, the urethane di(meth)acrylate having a number average molecular weight of at least 5,000 grams/mole and having a hydrophobic group selected from an olefinic group with at least 12 carbon atoms or from a carbocyclic aromatic group;
2) at least one monomer having a single (meth)acryloyl group in an amount of 30 to 70 weight percent based on a total weight of the polymerizable composition; and
b) a filler in an amount of at least 60 volume percent based on a total volume of the polymerizable composition plus filler, wherein the filler is spherical or roundish with a circularity greater than 0.70 and at least 90 percent of the filler has a longest dimension greater than 50 micrometers; and
wherein
the foam has a void volume of 25 to 50 volume percent based on a total volume of the foam in an uncompressed state; and
the foam is not a pressure-sensitive adhesive.

12. The foam of claim 11, wherein the foam has an uncompressed first height that decreases at least 40 percent to a compressed second height when the foam is subjected to an applied pressure of 50 pounds per square inch (345 kPa).

13. The foam of claim 11, wherein the foam has a compression set at room temperature that is no greater than 40 volume percent.

14. The foam of claim 11, wherein the polymeric material is elastomeric.

15. The foam of claim 11, wherein the filler is a thermally conductive filler and the foam has a thermal conductivity greater than 0.3 Watts/meter-K when the foam is compressed 5 volume percent based on a total volume of the foam.

* * * * *